United States Patent
Gaskell

(10) Patent No.: US 10,995,838 B2
(45) Date of Patent: May 4, 2021

(54) CONTINUOUSLY VARIABLE TRANSMISSION

(71) Applicant: ALLISON TRANSMISSION INC., Indianapolis, IN (US)

(72) Inventor: Christopher Gaskell, Leyton (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 57 days.

(21) Appl. No.: 16/092,160

(22) PCT Filed: Apr. 12, 2017

(86) PCT No.: PCT/GB2017/051030
§ 371 (c)(1),
(2) Date: Oct. 8, 2018

(87) PCT Pub. No.: WO2017/178821
PCT Pub. Date: Oct. 19, 2017

(65) Prior Publication Data
US 2019/0113121 A1    Apr. 18, 2019

(30) Foreign Application Priority Data
Apr. 12, 2016 (GB) ................................. 1606303
Aug. 5, 2016 (GB) ................................. 1613543

(51) Int. Cl.
*F16H 37/10* (2006.01)
*F16H 15/38* (2006.01)
*F16H 37/08* (2006.01)

(52) U.S. Cl.
CPC ........... *F16H 37/086* (2013.01); *F16H 15/38* (2013.01); *F16H 37/10* (2013.01);
(Continued)

(58) Field of Classification Search
CPC ......... F16H 2037/103; F16H 2037/105; F16H 37/086; F16H 37/10
See application file for complete search history.

(56) References Cited

U.S. PATENT DOCUMENTS 6,099,431 A * 8/2000 Hoge ................... F16H 37/086
475/214
6,217,473 B1 * 4/2001 Ueda ....................... F16H 15/38
475/216

(Continued)

FOREIGN PATENT DOCUMENTS

JP         2008232286 A  * 10/2008

OTHER PUBLICATIONS

International Search Report & Written Opinion of PCT/GB2017/051030, European Patent Office, dated Apr. 1, 2018.

*Primary Examiner* — Ernesto A Suarez
*Assistant Examiner* — Lillian T Nguyen
(74) *Attorney, Agent, or Firm* — Taft Stettinius & Hollister LLP; Stephen F. Rost

(57) ABSTRACT

The invention relates to a continuously variable transmission (CVT) comprising a ratio varying unit and a compound epicyclic gear set. The ratio varying unit has a rotating first side and a rotating second side, the rotational axes of the first and second sides being coaxial. The compound epicyclic gear set comprises a first set of planets, being rotationally mounted within a carrier and meshing with a sun gear. The epicyclic gear set also has a first annulus gear and a second set of planets; the second set of planets also being rotationally mounted within the carrier and meshing with a second annulus gear. One of the first or second rotating sides of the ratio varying unit is coupled to the carrier and the other of the first or second rotating sides of the ratio varying unit is coupled to the sun gear.

20 Claims, 17 Drawing Sheets

(52) U.S. Cl.
CPC .......... *F16H 2015/383* (2013.01); *F16H 2037/0873* (2013.01); *F16H 2037/103* (2013.01); *F16H 2200/2023* (2013.01)

(56) References Cited

U.S. PATENT DOCUMENTS

| | | | |
|---|---|---|---|
| 6,358,178 B1 * | 3/2002 | Wittkopp | F16H 37/086 475/207 |
| 6,866,606 B2 * | 3/2005 | Ooyama | F16H 37/086 475/208 |
| 6,981,928 B2 * | 1/2006 | Inoue | F16H 37/086 475/214 |
| 2005/0202930 A1 * | 9/2005 | Imanishi | F16H 61/6648 477/39 |
| 2006/0189432 A1 * | 8/2006 | Tsuchiya | F16H 37/086 475/216 |
| 2012/0040794 A1 * | 2/2012 | Schoolcraft | F16H 37/086 475/207 |
| 2018/0274596 A1 * | 9/2018 | Dionne | F16D 13/76 |

* cited by examiner

| Mode | Overall speed ratio (incl. final drive) | L | M | H | P |
|---|---|---|---|---|---|
| LOW *(IVT)* | -0.080 to 0.048 | x | | | |
| MID *(Powersplit)* | 0.048 to 0.252 | | x | | |
| HIGH *(Powersplit)* | 0.252 to 0.482 | | | x | |
| Park (PL) | 0.000 | x | | | x |
| Gear 1 (LM) | 0.048 | x | x | | |
| Gear 2 (PM) | 0.125 | | x | | x |
| Gear 3 (MH) | 0.252 | | x | x | |
| Gear 4 (PH) | 0.395 | | | x | x |

← pitch actuator motion

CONTINUOUSLY VARIABLE TRANSMISSION

This application is a U.S. national stage application under 35 U.S.C. § 371 of PCT International Application Serial No. PCT/GB2017/051030, which has an international filing date of Apr. 12, 2017, designates the United States of America, and claims the benefit of GB Application No, 1606303.4, which was filed on Apr. 12, 2016, and GB Application No. 1613543,6, which was filed on Aug. 5, 2016, the disclosures of which are hereby expressly incorporated by reference in their entirety.

The present invention relates to continuously variable transmissions and in particular, but not exclusively, to continuously variable transmissions used in automotive vehicles such as passenger cars, including front wheel drive passenger cars.

In a front wheel drive passenger car the engine is typically mounted perpendicular to the front-rear vehicle axis. The transmission typically attaches to, and receives drive from, the end of the engine such that the engine and transmission shafts run parallel to the shafts which drive the wheels of the vehicle. A transmission in such an application is typically required to be short enough so that is fits inside the engine bay without fouling the vehicle bodywork.

In front wheel drive cars, the physical constraints imposed on their construction result in the engine normally being mounted above the final drive arrangement. Consequently, the transmission needs to provide for a vertical drop from the engine output shaft to the differential unit, from which shafts drive the left and right hand wheels.

Passenger cars are required to provide reverse, launch, urban cruise and preferably high overdrive ratio functions. Automatic transmissions which transfer the drive between the engine and wheels must perform the transition between the ratios required to provide such functions automatically in response to driver inputs, and preferably, smoothly and seamlessly. Launch operation in such transmissions is often achieved using a slipping clutch or a torque converter. Both devices dissipate heat and are therefore inefficient. The transitions between any of the ratios required to provide such functions are usually achieved by clutches which slip transiently as the transmission hands over from one ratio to the next. This also dissipates energy, but also can result in jerk or a torque interruption which may be felt by the driver.

Continuously variable transmissions (CVTs) can provide smooth transitions between ratios but are typically mechanically less efficient than fixed ratio transmissions. Variator power losses typically arise from two main areas: firstly, slip and friction in belt or chain systems, or slip and spin in traction drive systems; and secondly, the power to provide variator clamp load, and to effect ratio changes. The complexity of variator actuation systems also tends to increase the overall CVT cost. Recent advances dramatically reduce the losses and cost of a full-toroidal traction drive variator without sacrificing controllability or response.

This has been achieved through improved variator clamping, reduced actuation losses and a wide variator ratio spread of 10 or more, which can significantly improve the performance of the transmission. A roller control mechanism incorporating an actuator with maximum output power of approximately 20W is proposed. The control mechanism is low cost, yet allows the variator to achieve a full ratio sweep in less than 300 milliseconds.

These variator developments have also enabled a family of new, cost-effective and responsive transmission architectures, which provide increased efficiency compared to previous generations. CVT architectures are proposed for a 170 Nm/92 kW front wheel drive B-segment passenger car application, though the concepts are scalable to larger platforms. Peak simulated cruise efficiencies of circa 95% are presented for transmission layouts with an overdrive capability of approximately 56 kph/1000 rpm.

The technology is shown to be relevant to future automotive trends, including electrification and autonomous driving.

Many CVTs are also bulky and/or costly and therefore achieving the packaging shape and size, and the target cost of manufacture, can be challenging.

The maximum operating ratio of the transmission divided by the minimum operating ratio of the transmission is termed the "ratio spread" of the transmission. Modern transmissions such as dual clutch transmissions (DCTs), have a ratio spread of between 6 and 10. This can be advantageous in providing a high overdrive ratio for efficient engine operation at high vehicle speed or cruising, but can also offer a reduced minimum transmission ratio which reduces losses in a launch device such as a clutch or torque converter. A reduced minimum transmission speed ratio can also have a beneficial effect on launch clutch durability. Achieving a high ratio spread CVT with high efficiency can be challenging.

It is to be noted that, for a fixed maximum forwards ratio, a wider ratio spread in the variator enables increased launch efficiency, both in embodiments which feature a reversing mode, and in embodiments which feature a low mode (IVT mode). Where a low mode (IVT mode) is included in the transmission, the wide ratio spread of the combined first and second modes enables power through the ratio varying unit to be reduced in the low mode thus allowing for a smaller and lower cost ratio varying unit.

Torotrak's heritage is in the field of Infinitely Variable Transmissions (IVTs). An IVT is a CVT that can create zero output speed, typically comprising a variator and an epicyclic gearset, enabling seamless vehicle launch and forwards-reverse transition. These have demonstrated excellent driveability and refinement in a wide variety of vehicles, including passenger cars, RWD SUVs, buses, trucks and off-highway vehicles, ranging from 5 kW to over 300 kW. The Torotrak IVT has significant potential to reduce energy consumption and emissions. A fuel economy improvement of 19% has previously been measured in urban driving compared to an automatic transmission with torque converter (with up to 23% simulated on an optimized transmission). This benefit is attributable to eliminating the torque converter, optimizing the engine operating conditions and removing abrupt engine accelerations that would normally occur during gear shifts.

Traditionally, variator and IVT technology has been controlled hydraulically. More recent work pioneered for low-cost auxiliary drive applications has resulted in the development of another successful method of variator control known as PitchSteer™.

The actuator in Torotrak's PitchSteer™ mechanism is theoretically completely isolated from the traction forces within the variator. This means the actuator effort is very low and, more specifically, independent of the torque transferred by the variator. Only 10-20 Watts is required to change ratio and no power is required to hold a constant ratio. This results in low energy consumption for variator actuation and enables a small and low-cost actuator to be used.

FIG. 9a shows a PitchSteer variator. The actuator motion is demonstrated in FIG. 9b where movement of the actuator initiates a change in the pitch resulting ratio change as shown in FIG. 9c.

As can be seen in FIGS. 9a-9c, PitchSteer™ uses components that are simple to manufacture. When assembled they form a robust mechanism whose function is insensitive to manufacturing tolerances. In addition to promoting low manufacturing cost, this also ensures consistent performance over the entire life of the transmission. Sweeps through the entire variator ratio spread of 10 have been demonstrated in under 300 ms. The geometry of the latest designs could enable a ratio spread up to 12 to be achieved, if required. These attributes combine to provide a responsive method of variator control which consumes very low amounts of energy, using a low-cost electromechanical actuator.

For a mechanically actuated variator, hydraulic power is required only for clutching systems. Torotrak have simulated the energy consumption for the hydraulic pump over a standard drive cycle, as shown in FIG. 10a. The hydraulic circuit shown in FIG. 10b uses a single gerotor pump and only requires two low cost solenoids, covering low-pressure variator lubrication and proportional clutch control.

The energy consumption was found to be low compared to the energy delivered to the wheels to drive the vehicle, typically <1% over the cycle, and 1-2% for "wide open throttle" (WOT) acceleration events. These values will be even smaller when looking at the total energy consumed by the vehicle (taking account of transmission losses).

It is an aim of the present invention to provide a continuously variable transmission which addresses at least some of the above challenges.

Therefore according to the present invention there is provided a continuously variable transmission (CVT) comprising a ratio varying unit and a compound epicyclic gear set; the ratio varying unit having a rotating first side and a rotating second side, the rotational axes of the first and second sides being coaxial; the compound epicyclic gear set comprising a first set of planets; the first set of planets being rotationally mounted within a carrier and meshing with a sun gear, a first annulus gear and a second set of planets; the second set of planets also being rotationally mounted within the carrier and meshing with a second annulus gear; one of the first or second rotating sides of the ratio varying unit being driveably coupled to the carrier and the other of the first or second rotating sides of the ratio varying unit being driveably coupled to the sun gear.

The ratio varying unit may provide a negative speed ratio between the first and second rotating sides.

The ratio varying unit may comprise a toroidal variator, which may be a full toroidal variator. Preferably, both of the respective rotating sides of the ratio varying unit are directly connected to the compound epicyclic gear set.

A rotational axis of the compound epicyclic gear set is preferably coaxial with the rotational axes of the first and second sides of the ratio varying unit.

The present invention also provides a transmission comprising: a transmission input shaft; a transmission output shaft; a ratio varying unit having a rotating first side and a rotating second side; an epicyclic gear arrangement comprising a first member which can be driven by a first side of the ratio varying unit, a second member which can be driven by the second side of the ratio varying unit, a third member, and a fourth member which can be driven by the transmission input shaft; a first clutch arrangement configured to driveably couple the first member to the output shaft; a second clutch arrangement configured to driveably couple the second member to the output shaft; a third clutch arrangement configured to driveably couple the third member to the output shaft.

A fourth clutch arrangement may be provided to driveably couple two of the first, second and third clutch arrangements to the output shaft.

The two clutch arrangements may be selector devices coupled to the output shaft via the fourth clutch arrangement. The selector devices are preferably dog clutches and/or synchronisers.

The fourth clutch arrangement is preferably a "normally closed" friction clutch.

A fifth clutch arrangement may be provided to ground the third member.

Preferably, the first member is a sun gear, the second member is a carrier assembly, the third member is a first annulus gear and the fourth member is a second annulus gear.

In the frame of reference of the carrier assembly, the second annulus gear preferably rotates in the opposite direction to the sun gear and the first annulus gear.

The fifth clutch arrangement and one of the first, second or third clutch arrangements may be closed simultaneously whilst a speed ratio of the first and second rotating sides lies within a working range of the variator.

The first and second clutch arrangements may be closed simultaneously whilst a resultant speed ratio of the first and second rotating sides of the variator lies within a working range of the variator.

The second and third clutch arrangements may be closed simultaneously whilst a resultant speed ratio of the first and second rotating sides of the variator lies within a working range of the variator.

At one particular speed operating ratio of the ratio varying unit, the ratio of the speed of the transmission output shaft to the speed of the transmission input shaft (that is, the transmission ratio) is the same in both the first and second drive modes.

The epicyclic gear set may comprise a single compound epicyclic gear set. The epicyclic gear set may comprise a sun gear, a first annulus gear, a second annulus gear, and a single carrier.

The first and second sides of the variator may be coaxial. At least one of the first and second sides of the variator may be coaxial with the epicyclic gear set.

The epicyclic gear set may be mounted between the input shaft and the variator.

An electric motor may be coupled to the fourth member. An additional clutch arrangement may be provided between the fourth member and the input shaft. The additional clutch arrangement and the electric motor may be a standard "hybrid module".

A ratio range of the variator may be greater than seven, preferably greater than eight, more preferably greater than nine, and even more preferably equal to ten.

The variator may be a full-toroidal variator.

The first member may be a sun gear; the second member may be a planet carrier, containing first and second sets of planets gears; the fourth member may be a first annulus (or ring) gear; the third member may be a second annulus (or ring) gear; the first set of planet gears may be in mesh with the sun gear, the first annulus (ring) gear and the second set of planet gears; the second set of planet gears may also be in mesh with the second annulus (ring) gear.

In preferred embodiments, the output of each of the clutches is adapted to drive a common rotatable member. This rotatable member may be coupled or couplable to the transmission output shaft.

In a further aspect of the present invention, there is provided a transmission input shaft; a transmission output shaft; a ratio varying unit having a rotating first side and a rotating second side, the rotational axes of the first and second sides being coaxial; an epicyclic gear set comprising a first input arranged to be driven by the transmission input shaft, a second input arranged to be driven by a first side of the ratio varying unit, and a third input arranged to be driven by the second side of the ratio varying unit; a first drive mode in which the speed of the transmission output is proportional to the speed of the first side of the ratio varying unit, and a second drive mode in which the speed of the transmission output is proportional to the speed of the second side of the ratio varying unit, wherein at one particular speed operating ratio of the ratio varying unit, the ratio of the speed of the transmission output shaft to the speed of the transmission input shaft is the same in both the first and second drive modes.

In accordance with the invention there is also provided a transmission comprising: a transmission input shaft; a transmission output shaft; a ratio varying unit having a rotating first side and a rotating second side, the rotational axes of the first and second sides being coaxial; an epicyclic gear set comprising a first input which is driveably coupled to the transmission input shaft, a second input which is driveably coupled to a first side of the ratio varying unit, and a third input which is driveably coupled to the second side of the ratio varying unit; a first drive mode in which the speed of the transmission output is driveably coupled to the speed of the first side of the ratio varying unit, and a second drive mode in which the speed of the transmission output is driveably coupled to the speed of the second side of the ratio varying unit, wherein at one particular speed operating ratio of the ratio varying unit, the ratio of the speed of the transmission output shaft to the speed of the transmission input shaft is the same in both first and second drive modes.

The elements that are driveably coupled may be connected via a ratio or coupling (such as a clutch) or other simple mechanical element.

The transmission output shaft is preferably arranged to rotate in the same direction as the transmission input shaft in the first and second modes.

The transmission is preferably arranged such that the first and second modes provide forwards vehicle operation only.

The transmission may be further adapted to define a synchronous shift point at a junction between the first and second modes.

There may be provided means for coupling drive to the transmission output in the first and second modes, and these means may comprise or be provided by first and second drive couplings respectively.

A ratio of the speed of the transmission output shaft to the speed of the transmission input shaft that occurs in both the first and second modes at a common speed ratio of the ratio varying unit is known as a "synchronous" ratio since the first and second couplings may be switched with no change in transmission ratio so that the mode shift is smooth, or seamless. First and second couplings may be simultaneously engaged at this first-second mode synchronous transmission ratio.

The maximum operating ratio of the ratio varying unit divided by the minimum operating ratio of the ratio varying unit is termed the "ratio spread" of the ratio varying unit.

The arrangement above is known as a "power-split" configuration because only a portion of the transmission input (or output) power is transferred through the ratio varying unit; the remainder of the power is transferred through generally more efficient mechanical paths. The transmission efficiency can therefore be increased beyond that of the ratio varying unit alone. However, one consequence of the power-split configuration is that the ratio spread of the transmission is less than that of the ratio carrying unit alone. The transmission ratio spread may be traded for transmission efficiency. In order to achieve the desired transmission efficiency, it may not be sufficient to achieve the required ratio spread with a single regime. However, with the first mode, first-second mode synchronous point and the second mode, the torque continuity and ratio spread typical of a single regime may be achieved, but with greater efficiency. Further, use of a more compact variator of lower cost and lower weight may be possible.

Configurations that include a ratio varying device coupled to a differential gear such as an epicyclic gear set are often known as "shunts". Where torque on one side of the ratio varying device and torque on an element of the differential gear set sum to provide an output torque (that is, a CVT output torque) the configuration is known as an "output coupled" shunt. Conversely, where torque on one side of the ratio varying device and torque on an element of the differential gear set sum to provide an input torque (that is, a CVT input torque) the configuration is known as an "input coupled" shunt. Each of the first and second modes are preferably output coupled shunts. This provides the benefit that efficiency increases towards maximum CVT ratio, thus providing good efficiency under vehicle cruise conditions.

Most ratio varying devices have ratio spreads between 4 and 6, so it may be advantageous to employ a ratio varying device which has a generally higher ratio spread. The efficiency of each power-split mode generally increases with increasing ratio spread of the ratio varying unit. Preferably the ratio spread of the ratio varying unit is in excess of 5, more preferably in excess of 6.5, and especially preferably in excess of 8, or even in excess of 9. In some embodiments the ratio spread may be 10 or more. It may be shown that the transmission ratio spread of the first and second modes combined is similar to the ratio spread of the ratio varying unit. Therefore a relatively high ratio spread of the ratio varying unit offers a high transmission ratio spread of the combined first and second modes, the ratio spread being competitive with other modern fixed ratio transmissions. This enables efficient engine operation at vehicle cruise speeds and/or a low minimum forwards ratio for an efficient launch, for example using a clutch or torque converter.

As noted above, the ratio varying unit may comprise a toroidal variator. One example of variator which may be able to achieve a relatively high ratio spread is a "pitch steer" variator. Such a variator may comprise an input race and an output race each having a working surface, the races being coaxially mounted for rotation about a variator axis, and a toroidal cavity being defined between the working surfaces; at least one rolling element disposed between and being in driving engagement with adjacent rolling surfaces at respective contact regions, the or each rolling element having at least a first contact with a working surface, a second rolling contact, and being mounted on a carriage assembly for rotation about a rolling axis, the carriage being mounted for tilting about a tilt axis, the radius of the first contact region with respect to the variator axis being variable with the tilt angle of the carriage in accordance with the ratio of the variator, wherein: the or each rolling element is mounted for pivotal movement that causes a change in a pitch angle of the roller, the pitch angle being about a pitch axis that passes through the contact regions; the variator further comprising a control member operative to actuate the or a rolling element to undertake the said pivotal movement thereby changing the pitch angle, so urging the carriage or carriages to pivot about its or their tilt axis/axes and thereby provide a change in variator ratio.

Such a variator may be a rolling traction drive variator, and more particularly, a toroidal variator.

In another embodiment the ratio varying unit may include a variator which comprises an input race and an output race each having a working surface, the races being coaxially mounted for rotation about a variator axis, and a toroidal cavity being defined between the working surfaces; at least one rolling element disposed between and being in driving engagement with the working surfaces at respective contact regions, the or each rolling element having at least one contact with a working surface, a second rolling contact, and being mounted on a carriage assembly for rotation about a rolling axis, the contact radius with respect to the variator axis being variable in accordance with the ratio of the variator, wherein: the or each rolling element is mounted for pivotal movement that causes a change in a pitch angle of the roller, the pitch angle being about a pitch axis that passes through the contact regions; the variator further comprising a control member operative to actuate the or a rolling element to undertake the said pivotal movement thereby changing the pitch angle, so urging the carriage or carriages to pivot about its or their tilt axis/axes and thereby provide a change in variator ratio.

Such a variator may be a rolling traction drive variator, and more particularly, a toroidal variator.

One or both of the first and second drive couplings are preferably clutches. One or both clutches may be a wet clutch, a dry clutch for reduced drag loss, or a dog clutch. Both first and second couplings are preferably wet clutches which are actuated by hydraulic means. Preferably both the first and second drive modes are forward vehicle drive modes.

Preferably the ratio varying device is a rolling race variator. It may be a ball-and-ring variator, a toroidal variator, a half-toroidal variator, a Kopp variator or a full toroidal variator. Preferably the variator is a twin cavity variator since this may provide greater power and efficiency.

In a preferred embodiment, the ratio varying unit comprises a rotatable input disc, a rotatable output disc mounted coaxially with the input disc and a plurality of rollers of variable inclination transmitting rotation between the input disc and the output disc.

In a preferred embodiment the ratio varying unit comprises two outer discs, and two inner discs. One outer disc is more distant from the engine (the "distal" outer disc) than the other outer disc (the "proximal" outer disc). In other embodiments, there may be a single inner disc with working surfaces on opposing sides of the disc.

The outer discs are preferably arranged to be driven at a first common speed, which is variable, and the inner discs are preferably arranged to be driven at a second common speed, which is also variable.

Preferably there is a sun gear of the epicyclic gear set connected to the first side of the ratio varying unit.

The epicyclic sun gear and a first carrier of the epicyclic gear set are preferably mounted for rotation about a common axis with the ratio varying device races or discs (depending on the type of ratio varying device).

Preferably the epicyclic gear set is a simple epicyclic gear set comprising a single set of planets on a first carrier.

Preferably the first carrier is mounted for rotation with the second side of the ratio varying unit.

The sun gear may be driven by a hollow shaft. Said hollow shaft may also be connected to the ratio varying unit inner discs. Alternatively, the sun gear may be driven by a drum that extends from the inner disc or discs, the drum being of cylindrical character and encircling one cavity of the variator.

One outer disc of the ratio varying unit may be driven by a shaft that passes through the said hollow shaft. This outer disc is preferably the distal outer disc. The proximal outer disc may be coupled to the distal outer disc via the first carrier. Both outer discs and the first carrier may thus be mounted for common rotation.

Preferably on the first carrier there is a first set of planets in driving engagement with the sun gear. In this configuration, there is preferably a ring gear serving as the first input to the epicyclic gear set, and this is also in driving engagement with the first set of planets. The transmission output shaft axis is preferably offset from the transmission input shaft, this being offset from the axis of the transmission input shaft.

Preferably there is also an intermediate shaft. Preferably the first and second drive couplings are mounted on the intermediate shaft. The first side of the ratio varying device may be coupled to a first member mounted for rotation on the intermediate shaft. When the first mode is required, the first member may be coupled to the intermediate shaft by engaging the first coupling. The second side of the ratio varying device may be coupled to a second member mounted for rotation on the intermediate shaft. When the second mode is required, the second member may be coupled to the intermediate shaft by engaging the second coupling. The intermediate shaft is preferably coupled to the transmission output shaft.

Preferably the transmission input shaft, intermediate shaft and transmission output shaft are offset from one another. A final drive ratio is preferably achieved by two meshing gears, one mounted on the intermediate shaft and the other on the transmission output shaft. A differential gear is typically located on the transmission output shaft.

The transmission is adapted to be mounted to an engine. The transmission input shaft is preferably coaxial with and configured to be coupled or couplable to the engine, for example via one or more of a torsional damper, inertia (flywheel), clutch and/or torque converter. Preferably the epicyclic gear set is mounted engine-side of the ratio varying unit.

There may also be provided, in embodiments, a reverse mode of operation in which the speed of one side (first or second side) of the ratio varying unit is proportional to the speed of the transmission output.

In this reverse mode operation, preferably only one side (first or second side) of the ratio varying unit is driveably coupled to the transmission output. The reverse mode may be selectable by a coupling such as a wet clutch, dry clutch or a dog clutch.

Preferably a reverse drive coupling is mounted on the intermediate shaft. The first (or second) side of the ratio varying device may be coupled to a third member mounted for rotation on the intermediate shaft. When the reverse mode is required, the third member may be coupled to the intermediate shaft by engaging the third coupling.

In the above arrangement, the epicyclic gear set preferably comprises a sun gear, a carrier and a third element, and in which the drive ratio of said epicyclic gear set, defined as the ratio between the sun gear and the third element when the carrier is held constant, is negative. The transmission may further comprise a reverse mode for providing reverse vehicle operation. The reverse mode may be effected by actuation of a brake on an element of a reversing epicyclic gear set.

A "low" mode may be incorporated in the transmission as an alternative to the reverse mode. Such a low mode transmission may further comprise, a second epicyclic gear set comprising a first input whose speed is proportional to the speed of the transmission output shaft, a second input whose speed is proportional to the speed of the first side of the ratio varying unit, and a third input whose speed is proportional to the speed of the second side of the ratio varying unit.

Such a transmission may be operated in a low drive mode in which the speed of the transmission output is proportional to the speed of the first input of the second epicyclic gear.

A low mode transmission may comprise: a second epicyclic gear set comprising a first input which can be driven by the transmission output shaft, a second input which can be driven by a first side of the ratio varying unit, and a third input which can be driven by the second side of the ratio varying unit; a low drive mode in which the speed of the transmission output is driveably coupled to the speed of the first input of the second epicyclic gear set.

Preferably, at one particular speed operating ratio of the ratio varying unit, the transmission ratio is the same in both the low and first drive modes. The shift between the low mode and first mode may therefore be synchronous. Low mode and first mode couplings may be switched with no change in transmission ratio so that the mode shift is smooth or seamless. This low-first synchronous point occurs preferably at a low forwards vehicle speed.

Means may be provided for coupling drive to the transmission output in the low mode and such means may comprise a low coupling, and this low coupling may be in the form of a clutched coupling comprising a wet clutch, dry clutch or a dog clutch. Preferably the low mode is capable of providing a zero vehicle speed whilst the low mode coupling is engaged and the transmission input shaft is rotating. Preferably the low mode is also capable of providing a reverse vehicle speed.

Preferably, the first and second epicyclic gear sets rotate about a common axis with the ratio varying unit.

Preferably, on the carrier of the second epicyclic gear set (the second carried) there is provided a first ring and a second set of planets. The second epicyclic may be an idler epicyclic, or a planetary epicyclic.

Both the first and second epicyclic gear sets may be mounted engine-side of the ratio varying unit.

The low mode epicyclic gear set may be engine side of the ratio varying device.

There may be a common sun gear for the first and second epicyclic gear sets.

The first and second epicyclic gear sets may have a common carrier.

A common first set of planets may be used for both the first and second epicyclic gear sets.

The ratio spread of combined first and second modes may be greater than 6 and preferably greater than 7. Furthermore, it may be greater than 8 and more preferably greater than 9.

In another aspect of the present invention, there is provided a transmission comprising: a transmission input shaft; a transmission output shaft; a ratio varying unit having a rotating first side and a rotating second side; an epicyclic gear set comprising a first member which can be driven by the transmission input shaft, a second member which can be driven by a first side of the ratio varying unit, a third member which can be driven by the second side of the ratio varying unit, and a fourth member; a first drive mode in which the speed of the transmission output is proportional to the speed of the second member or the first side of the ratio varying unit, and a second drive mode in which the speed of the transmission output is proportional to one of the speed of the third member or second side of the ratio varying unit; a third drive mode in which the speed of the transmission output is proportional to the speed of the fourth member, wherein at one particular speed operating ratio of the ratio varying unit, the ratio of the speed of the transmission output shaft to the speed of the transmission input shaft (that is, the transmission ratio) is the same in both the first and second drive modes.

In a further aspect of the present invention, there is provided a transmission comprising: a transmission input shaft; a transmission output shaft; a ratio varying unit having a rotating first side and a rotating second side, an epicyclic gear set comprising a first member which is driveably coupled to the transmission input shaft, a second member which is driveably coupled to a first side of the ratio varying unit, a third member which is driveably coupled to the second side of the ratio varying unit, and a fourth member; a first drive mode in which the speed of the transmission output is driveably coupled to the speed of the first side of the ratio varying unit, and a second drive mode in which the speed of the transmission output is driveably coupled to the speed of the second side of the ratio varying unit; a third drive mode in which the speed of the transmission output is driveably coupled to the speed of the third member of the epicyclic gear set; wherein at one particular speed operating ratio of the ratio varying unit, the ratio of the speed of the transmission output shaft to the speed of the transmission input shaft (that is, the transmission ratio) is the same in both the first and second drive modes.

In the above aspects, the rotational axes of the first and second sides may be coaxial.

Embodiments of the invention will now be described in detail with reference to the attached Figures, in which:

FIG. 1 schematically shows an embodiment of the invention comprising a first mode, a second mode and a reverse mode;

FIG. 1b shows an alternative schematic depiction of the embodiments of FIGS. 1 and 1a;

Figure 2:
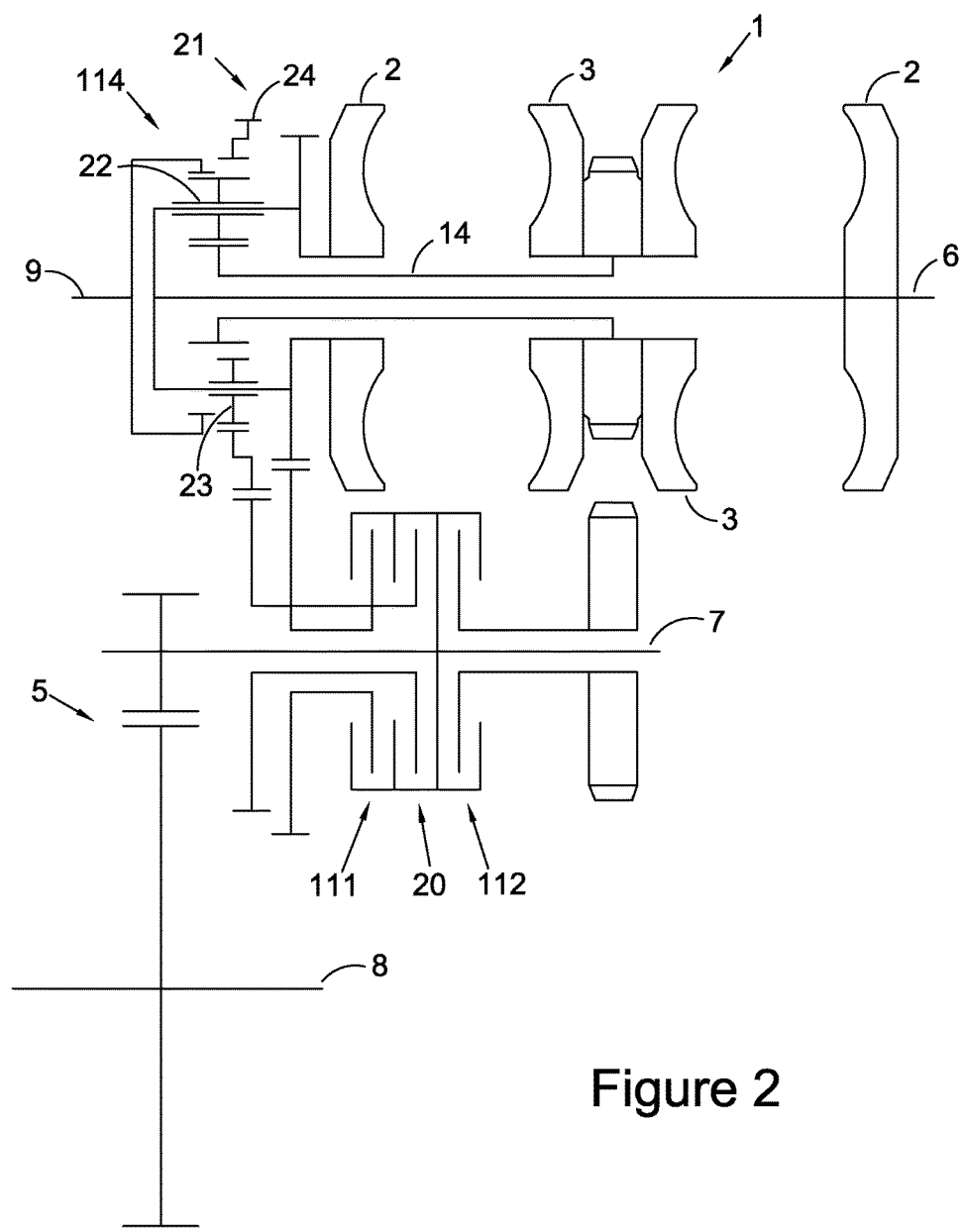
Figure 2A:
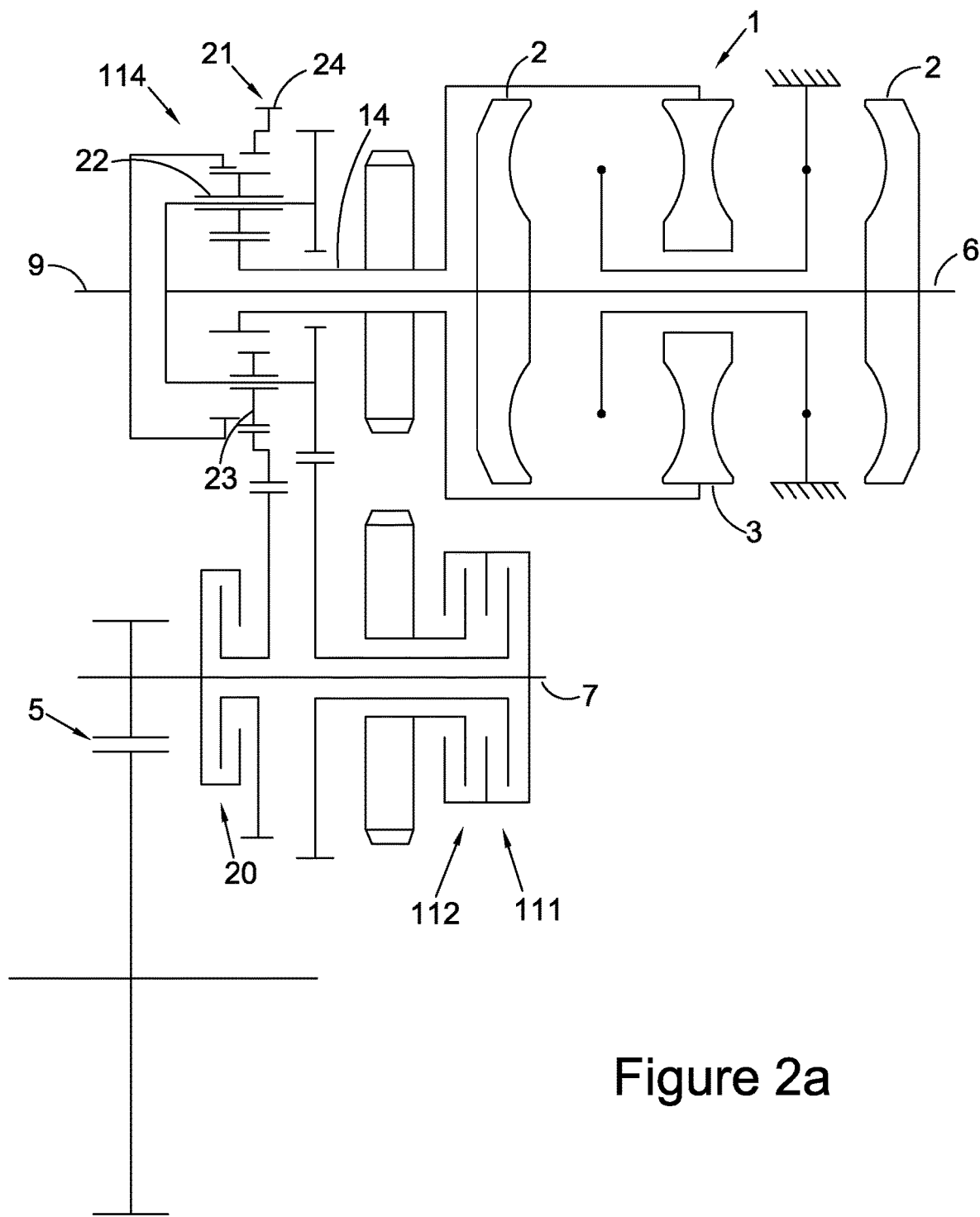
Figure 2B:
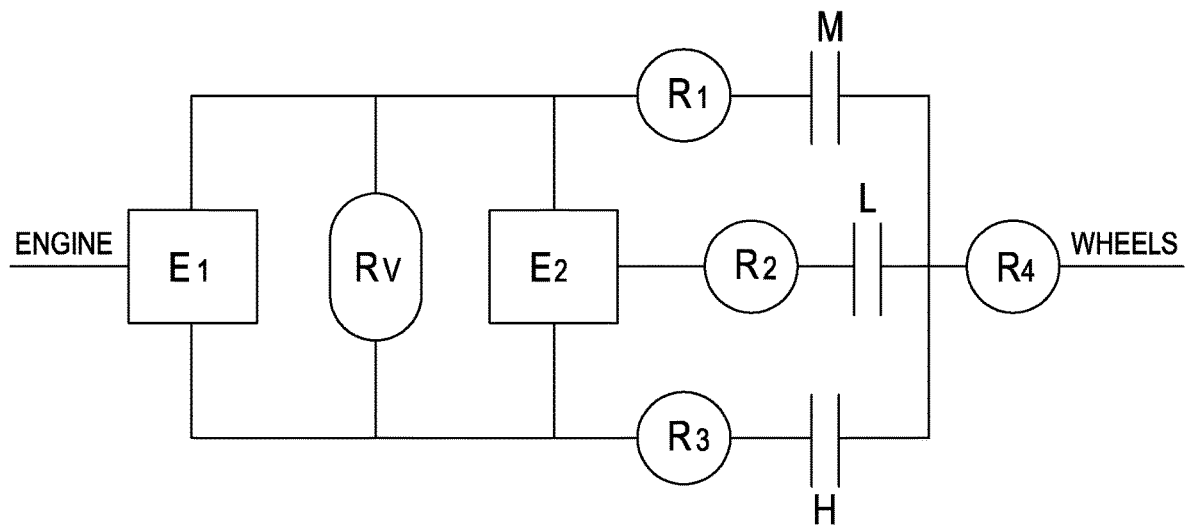
Figure 3:
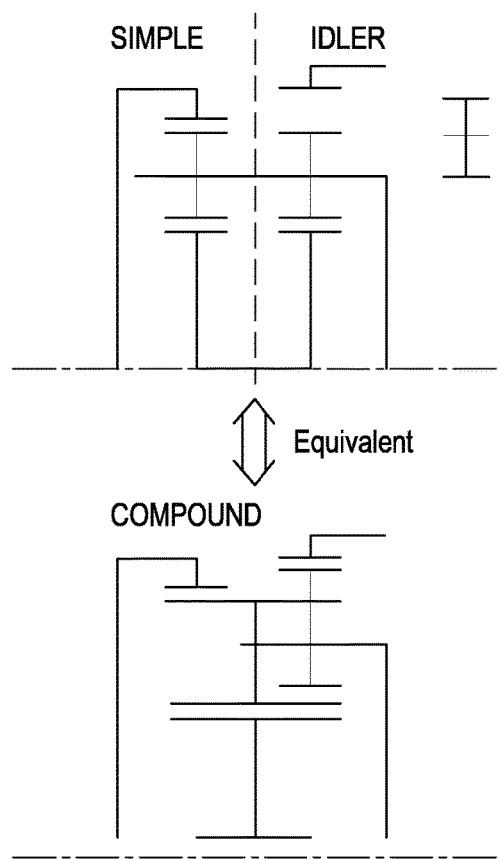
Figure 4:
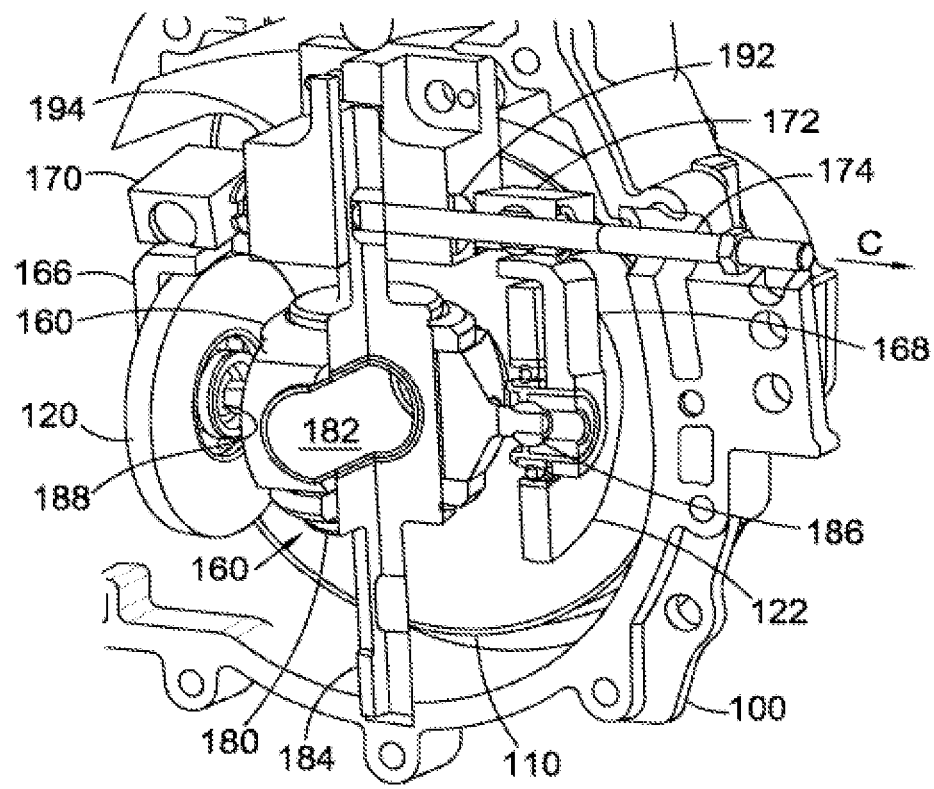
Figure 5:
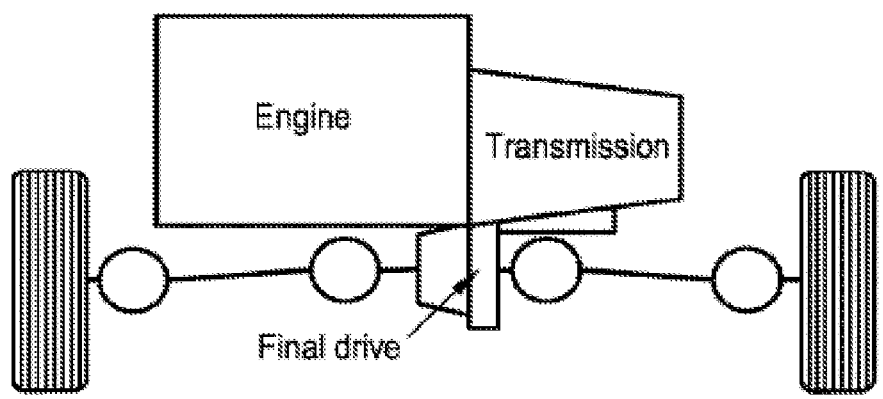
Figure 6:
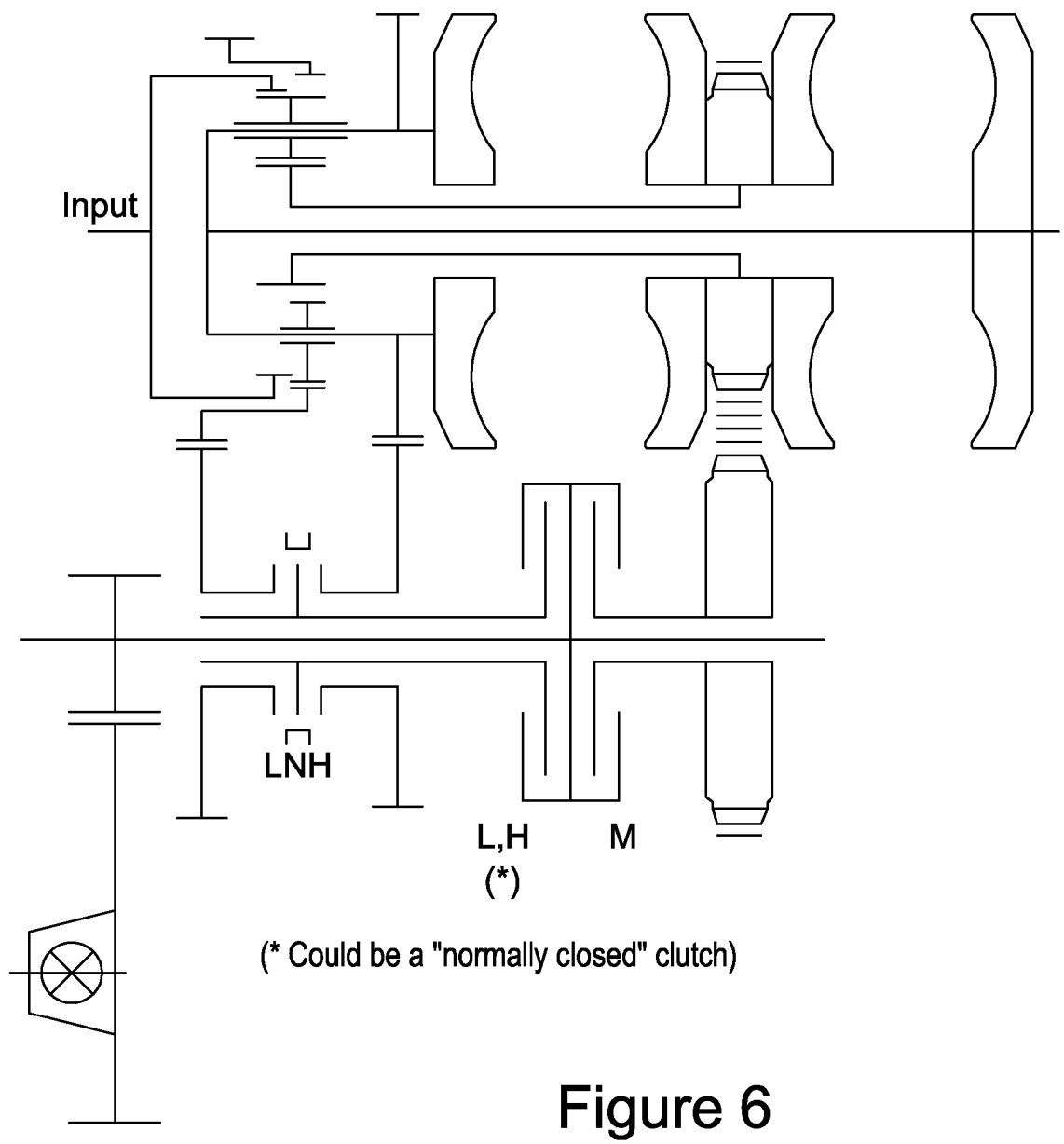
Figure 7:
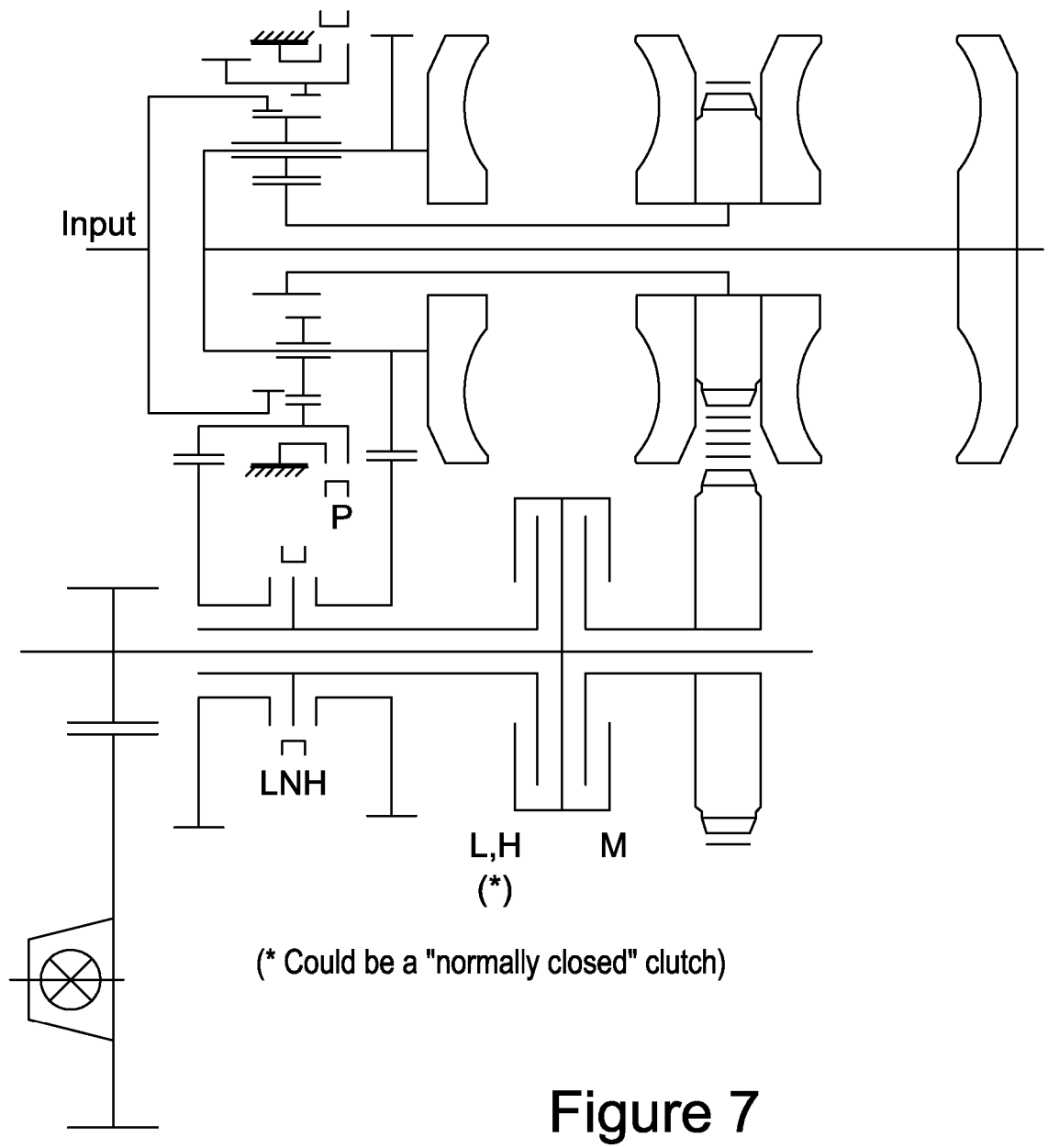
Figure 8A:
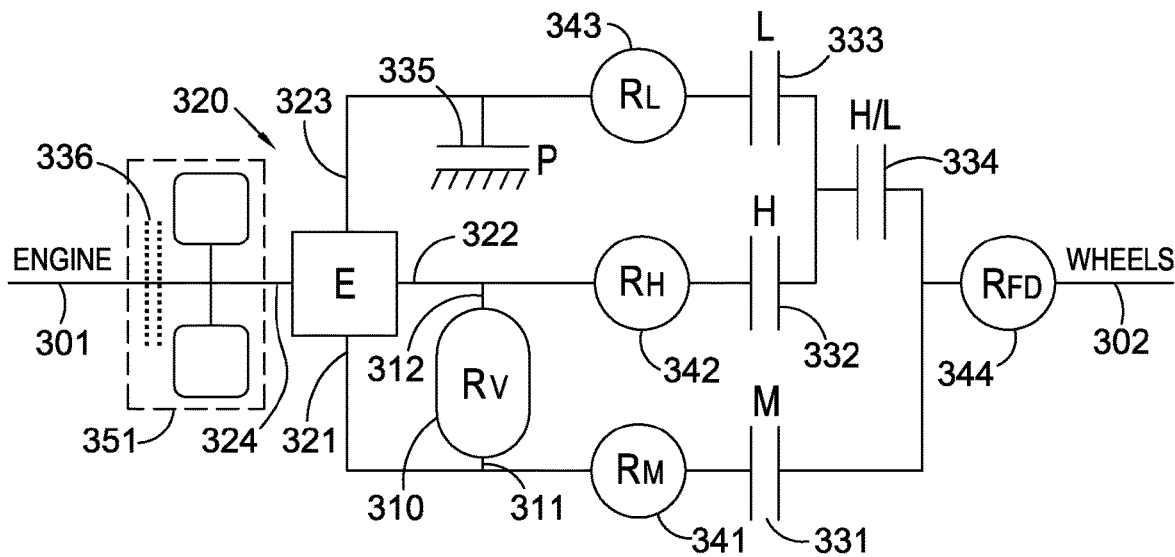
Figure 8B:
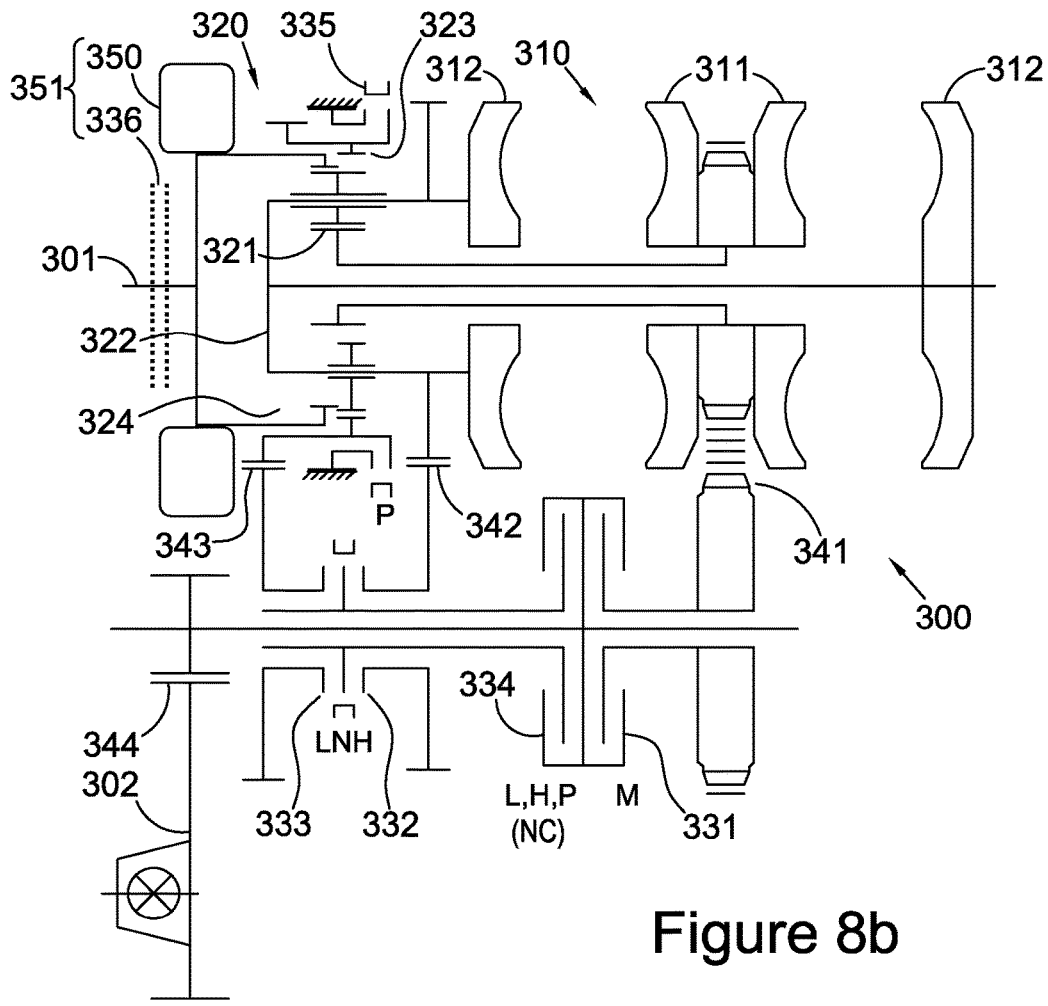
Figures 8C, 8D:
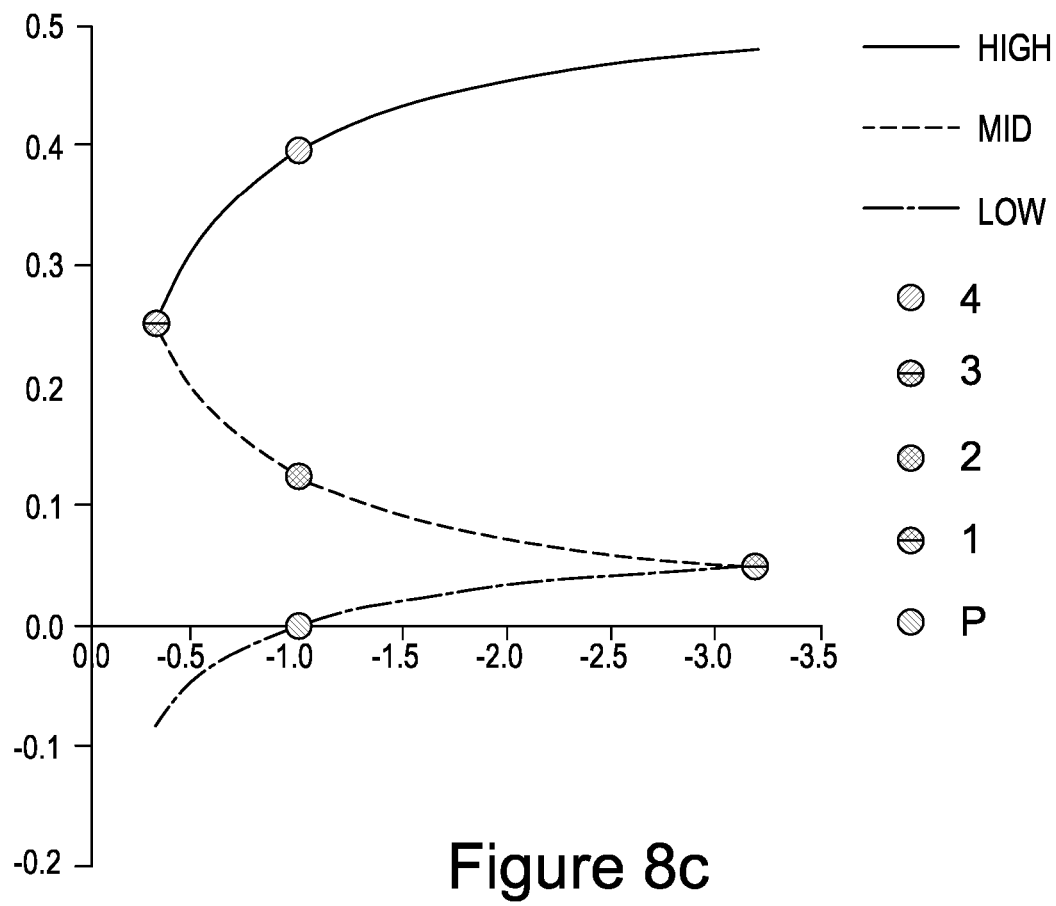
Figure 9A:
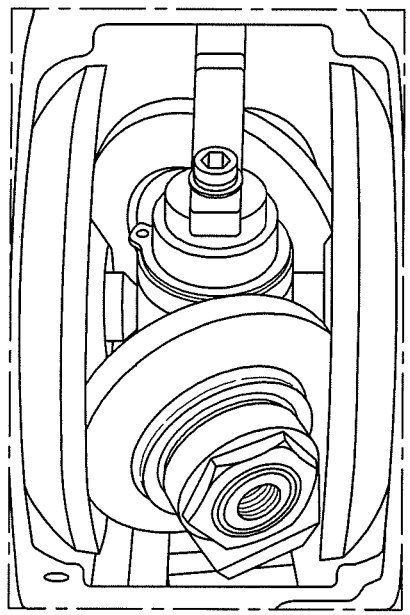
Figure 9B:
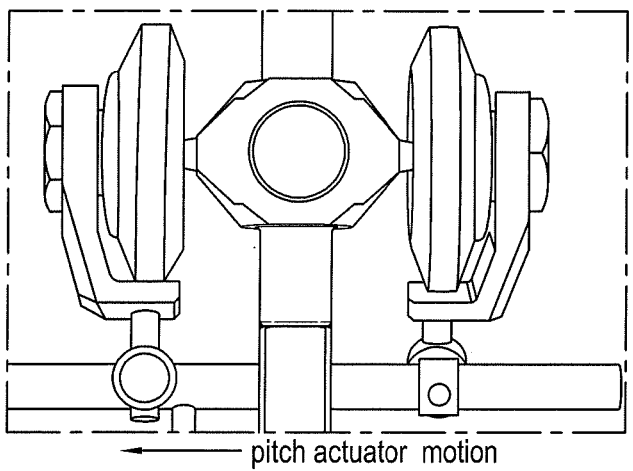
Figure 9C:
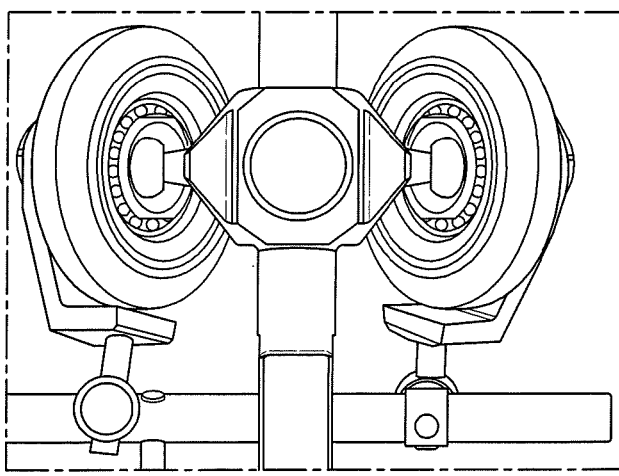
Figure 10A:
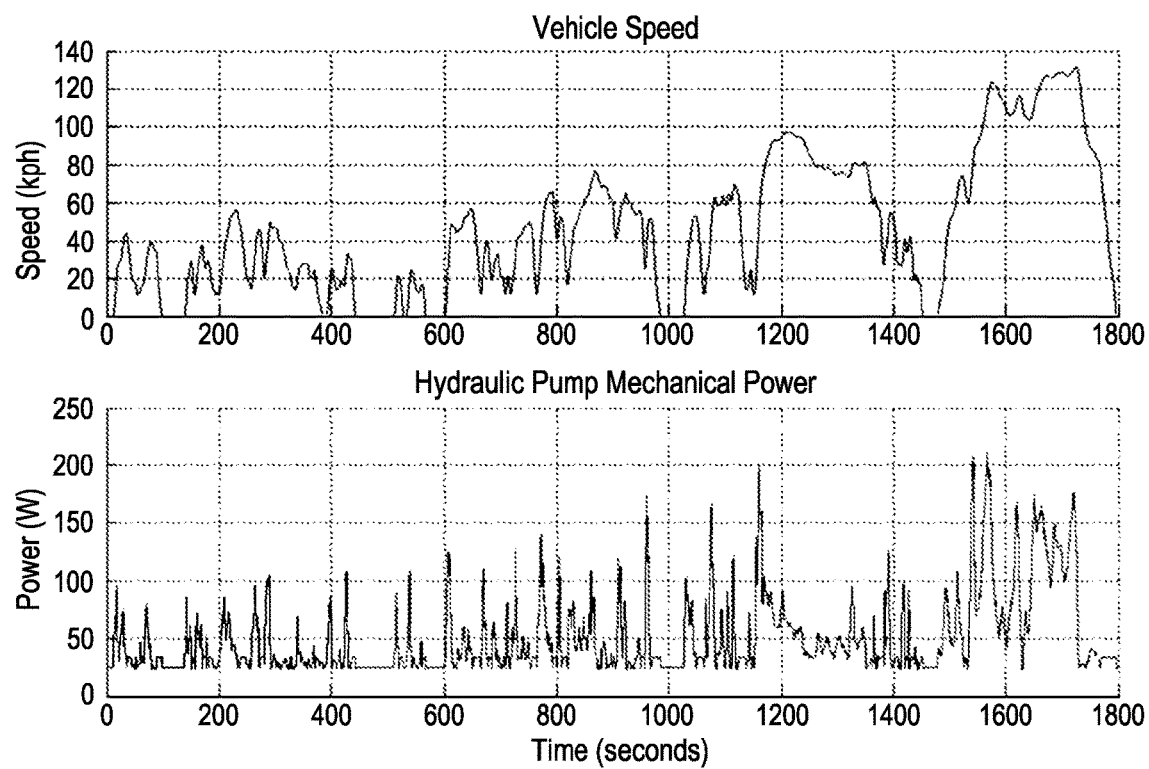
Figure 10B:
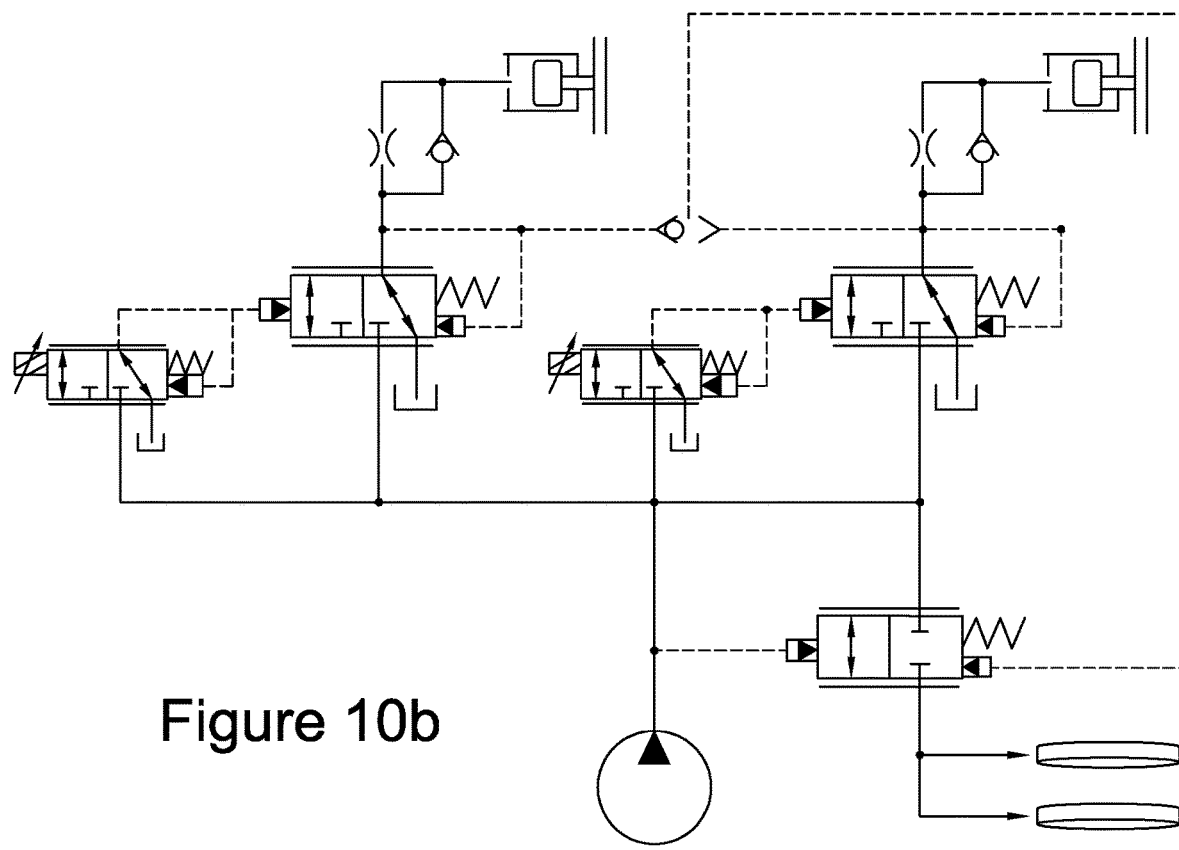
Figure 11A:
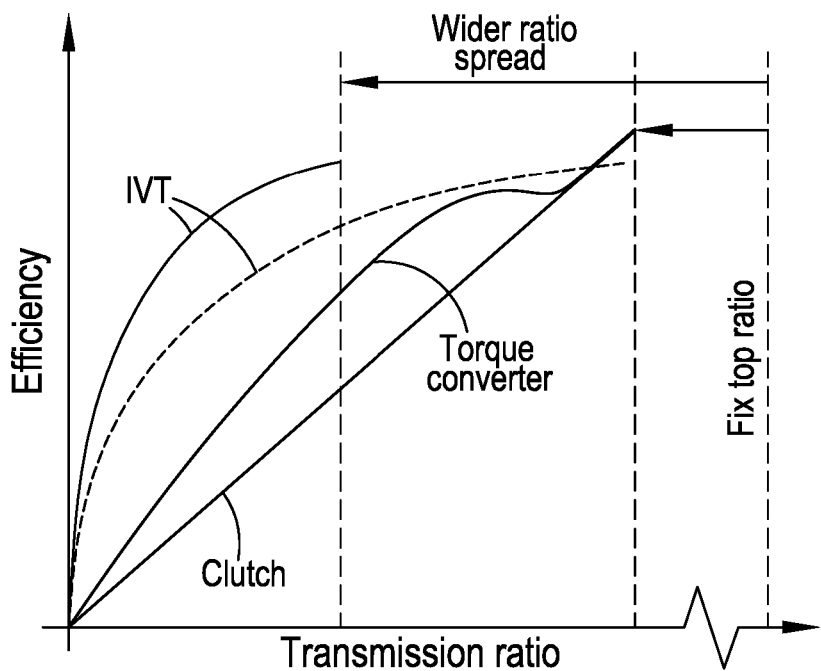
Figure 11B:
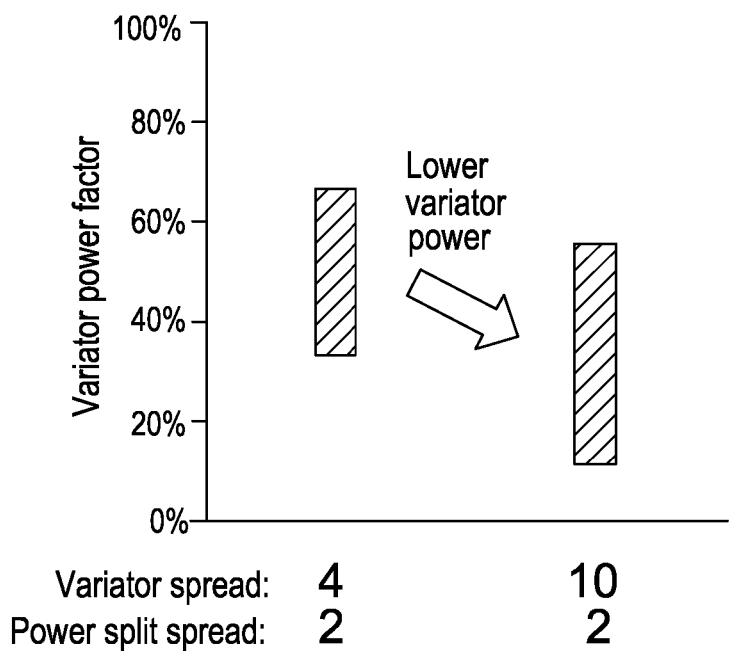
Figure 12A:
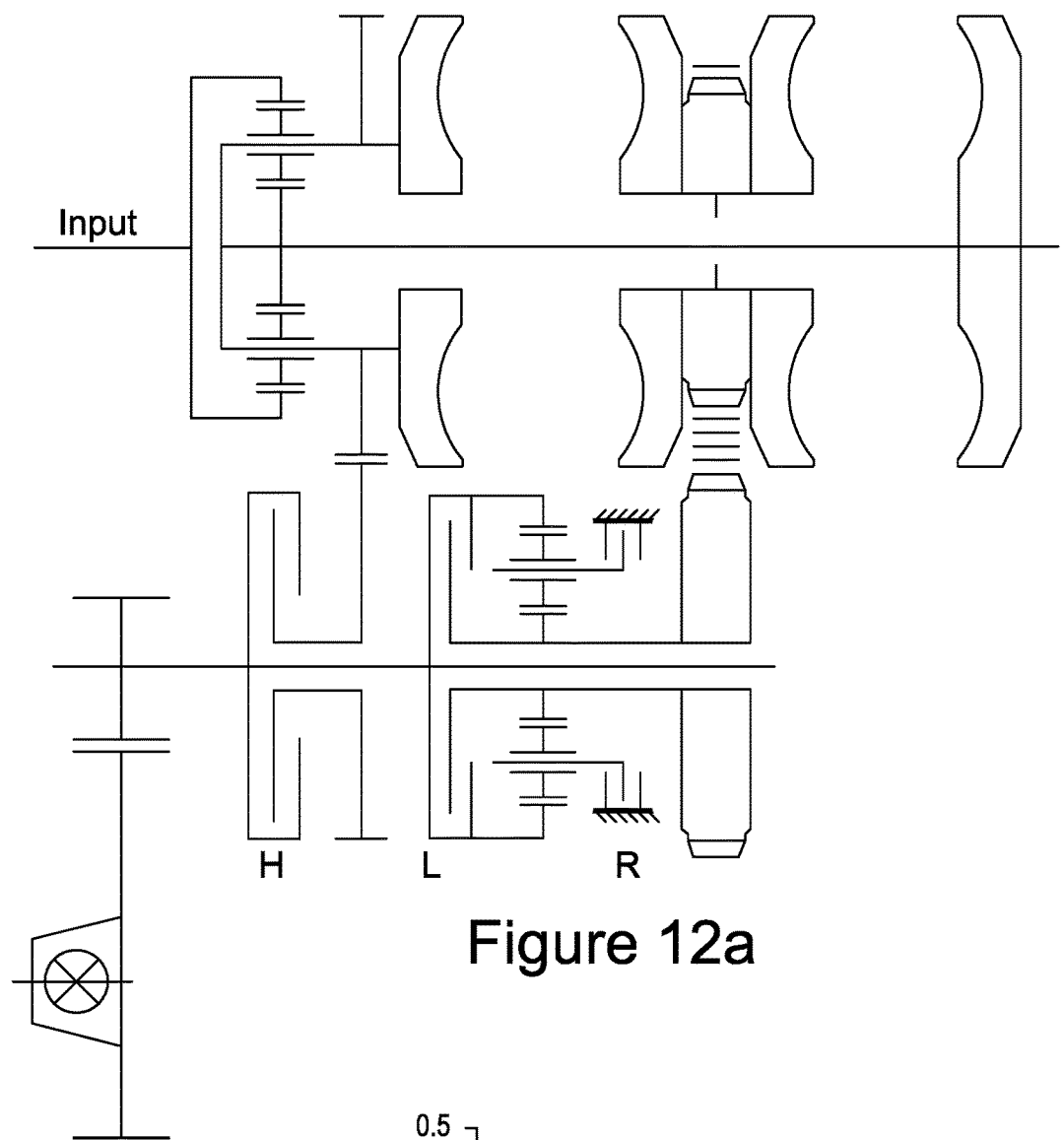
Figure 12B:
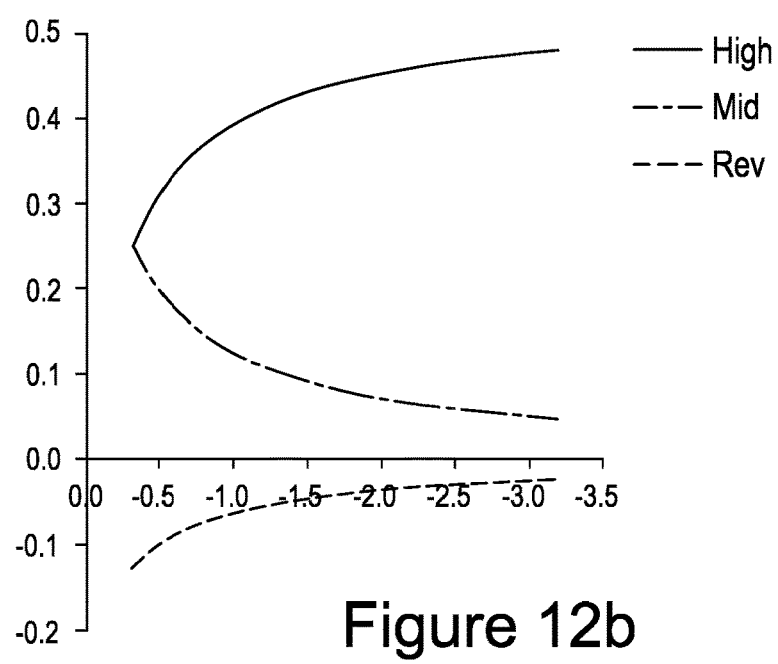
Figure 13A:
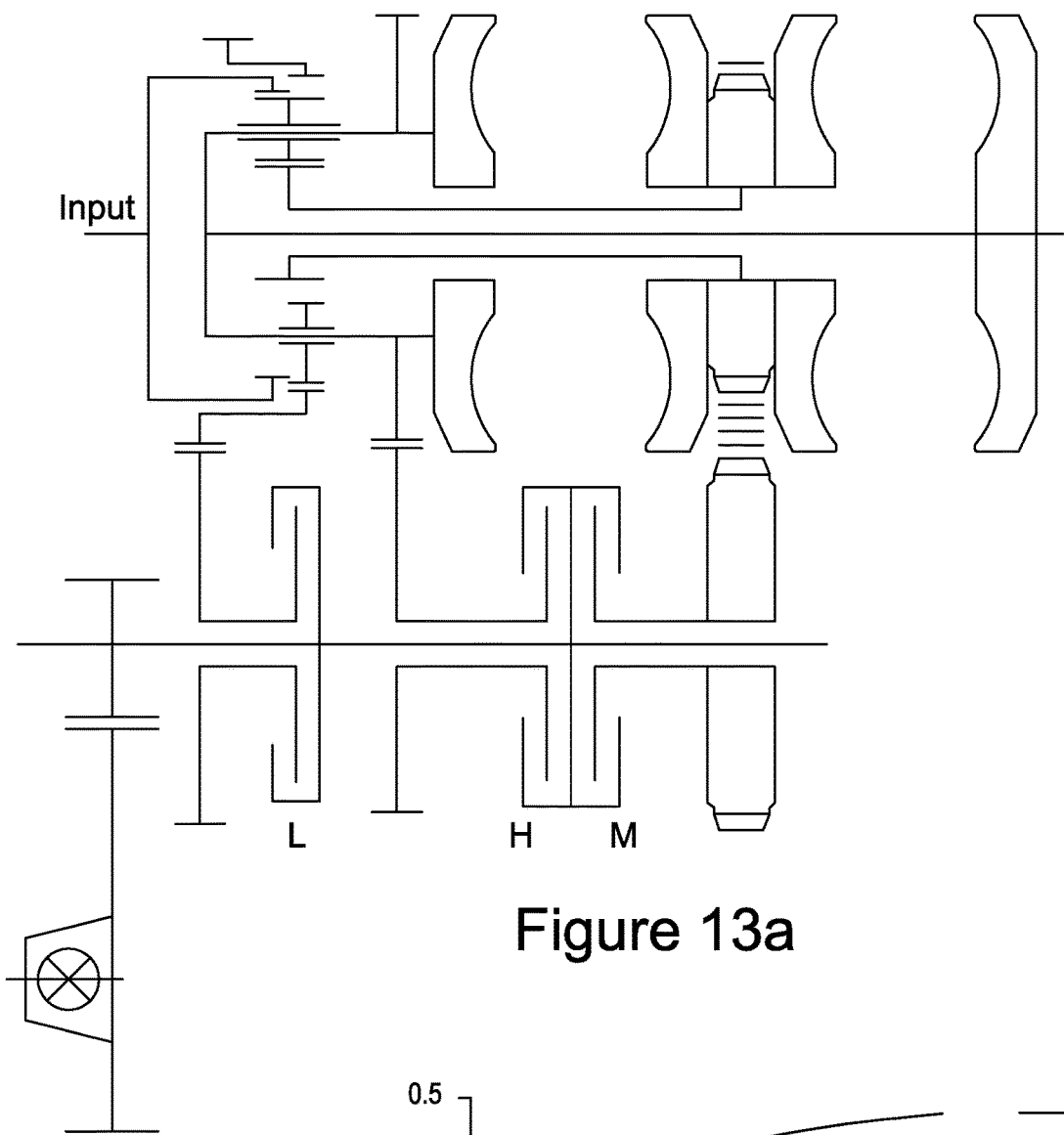
Figure 13B:
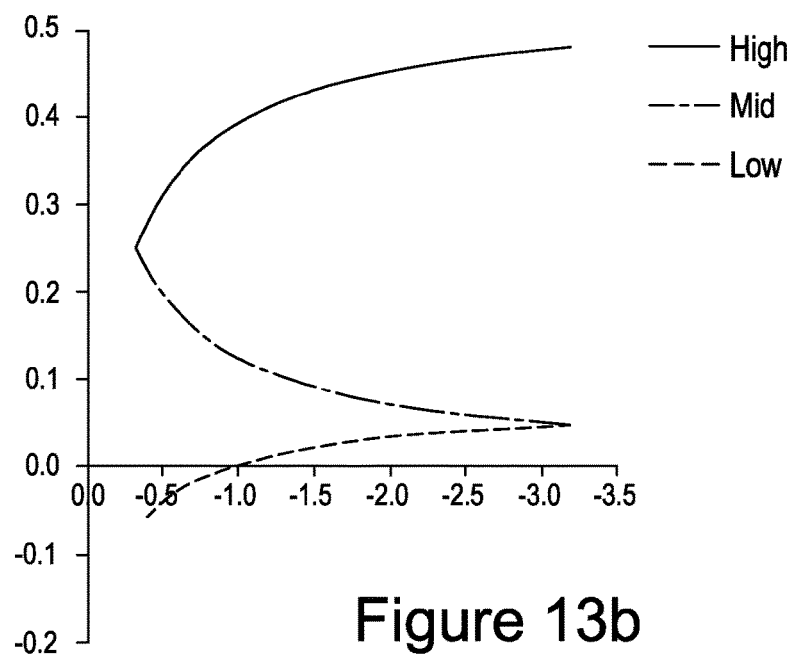
Figure 14:
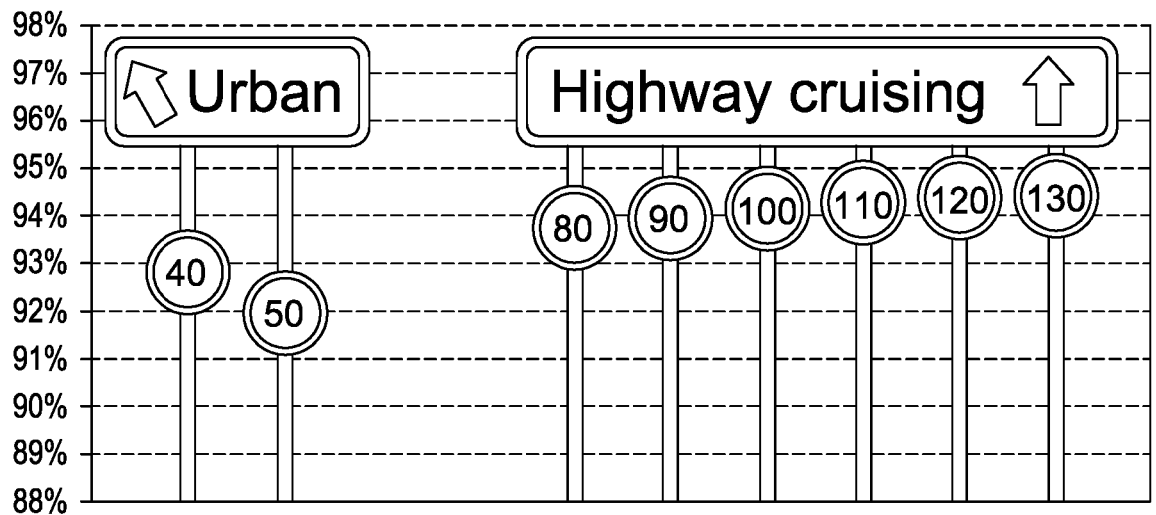
Figure 15:
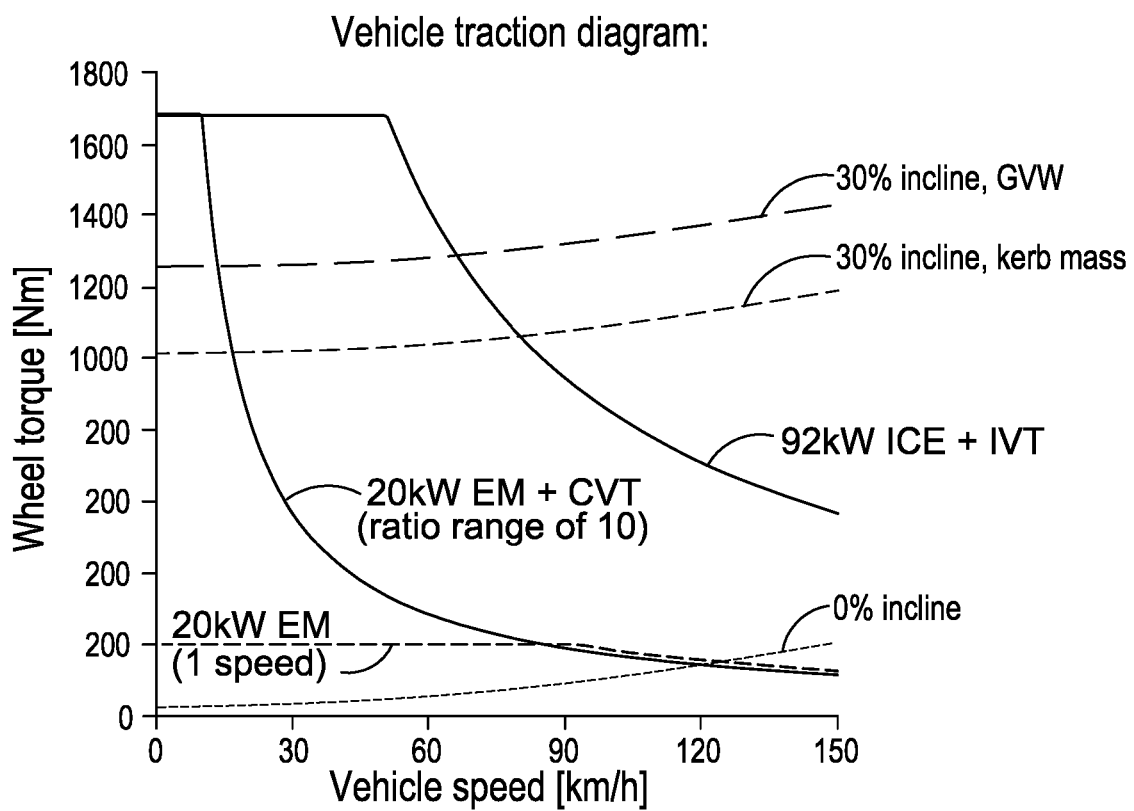

FIG. 2 schematically shows an embodiment of the invention comprising a low mode, a first mode and a high mode;

FIG. 2a shows an alternative embodiment functionally equivalent to that FIG. 2, but using a drum take-off from the variator centre discs;

FIG. 2b shows an alternative schematic depiction of the embodiments of FIGS. 2 and 2a;

FIG. 3 shows schematically how the first and second epicyclics in relation to FIGS. 2, 2a may be combined to form a compound epicyclic;

FIG. 4 schematically shows an embodiment of a pitch steer variator roller control system for a toroidal variator;

FIG. 5 schematically shows an embodiment of the present invention mounted to an engine in a transverse front wheel drive vehicle;

FIG. 6 schematically shows an embodiment of the invention with reduced clutch drag, comprising a low mode, a first mode, a second mode;

FIG. 7 schematically shows an embodiment of the invention comprising a low mode, a first mode, a second mode, and fixed ratio modes;

FIGS. 8a and 8b schematically show an embodiment of the invention with a motor to provide so-called hybrid functionality;

FIG. 8c shows the ratios for the 3-mode IVT with 2 forward powersplit modes and 4 fixed forward ratios and a park brake shown in FIG. 8b;

FIG. 8d shows an exemplary shift schedule for the arrangement shown in FIG. 8c;

FIGS. 9a to 9c show an exemplary pitch steer variator;

FIG. 10a shows a drive cycle simulation of pump energy consumption of a mechanically actuated variator;

FIG. 10b shows a hydraulic circuit of the mechanically actuated variator;

FIGS. 11a and 11b show a comparison of different launch devices and their efficiency characteristics;

FIGS. 12a and 12b show a schematic representation of a new transmission family and the corresponding overall transmission ratios;

FIGS. 13a and 13b show a schematic representation of a new transmission family and the corresponding overall transmission ratios;

FIG. 14 shows the efficiency of a 3-mode IVT with powersplit modes at various speeds; and FIG. 15 shows the ratio spread of the variator.

Figure 1:
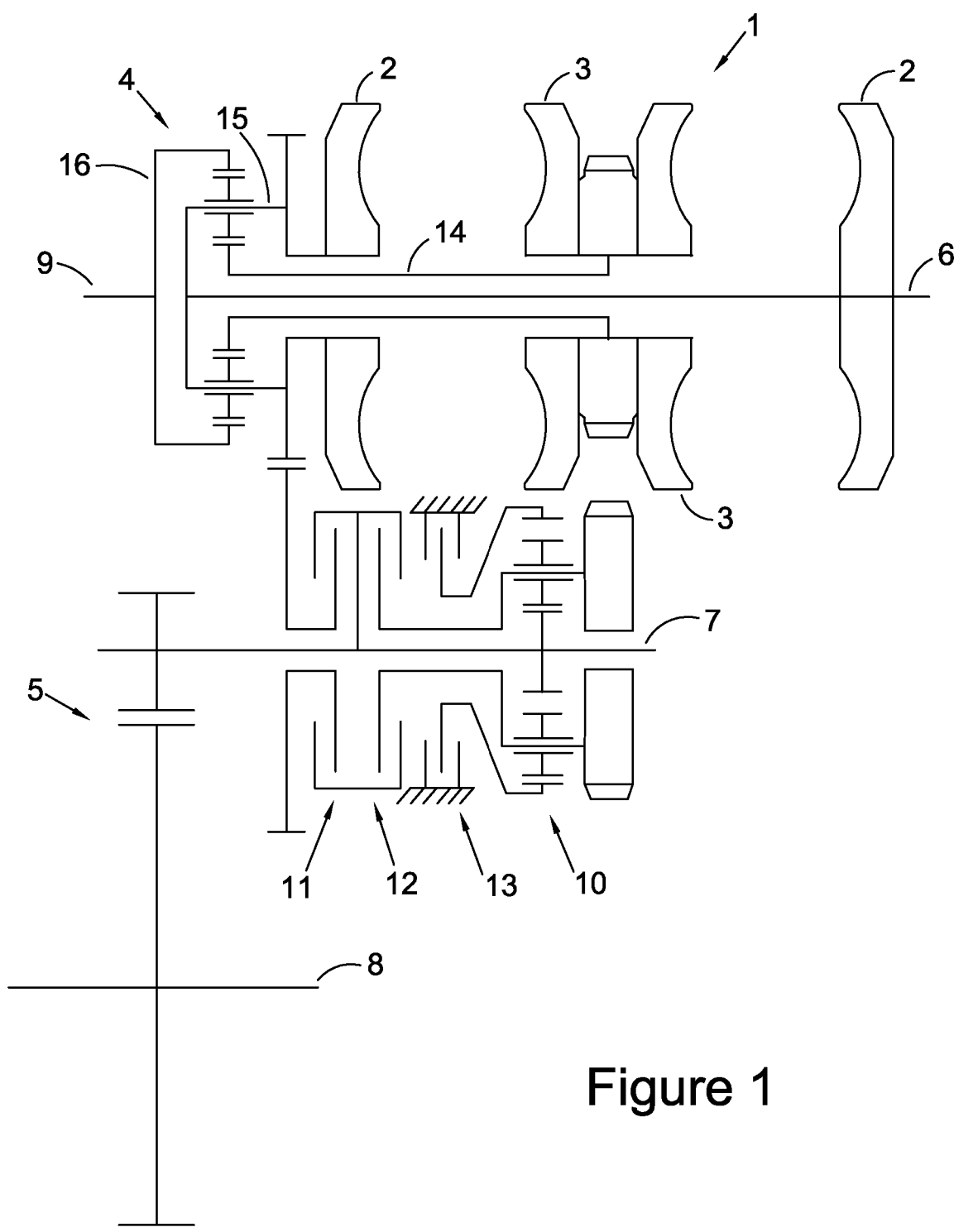
Figure 1A:
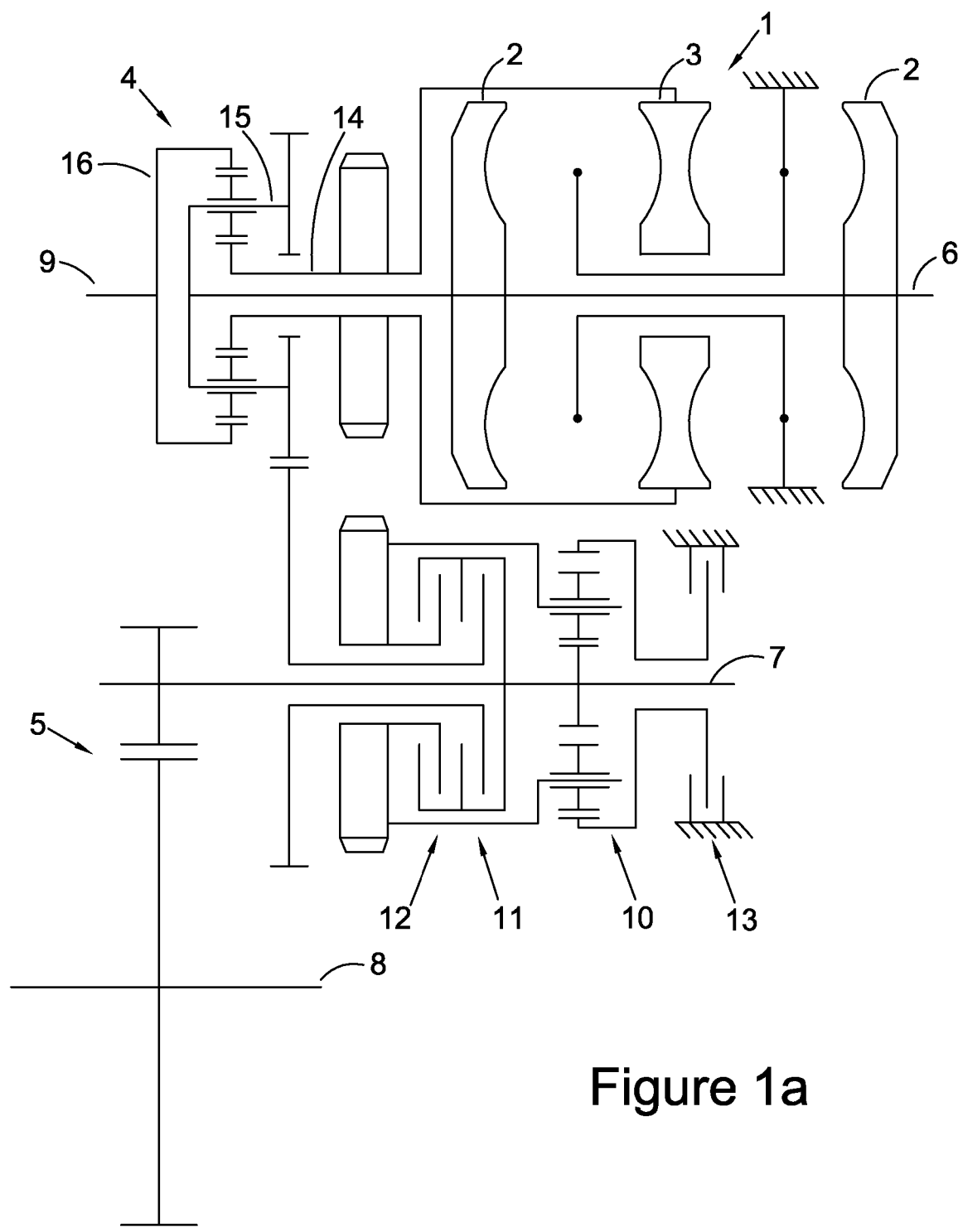
FIG. 1a shows an alternative embodiment functionally equivalent to that FIG. 1, but using a drum take-off from the variator centre discs.
Figure 1B:
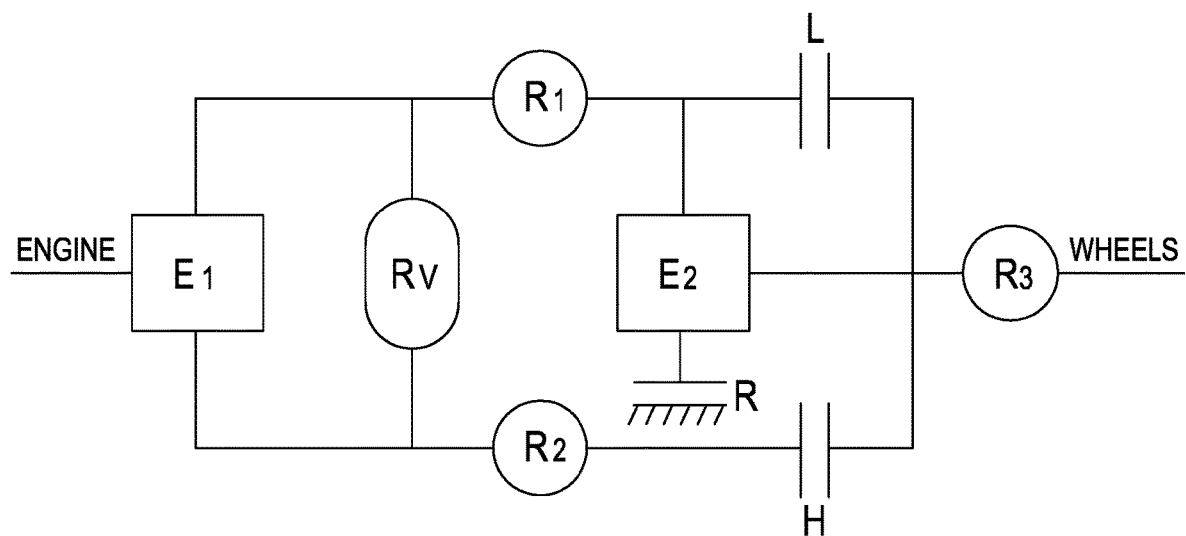

FIG. 1 depicts a mechanical layout of an arrangement of a continuously variable transmission that provides a reverse mode, a first mode and a high mode. The reverse mode provides reverse vehicle operation, whilst the first and second modes provide forwards vehicle motion up to a high overdrive transmission ratio. The mechanical connections, and the sequence of operation of the transmission, will now be described. A transmission input shaft 9 connects to an annulus gear of a simple epicyclic gear set 4. A carrier 15 of the epicyclic 4 is connected to a proximal input disc 2 of a ratio varying unit 1. A sun gear of the epicyclic 4 is connected via a hollow shaft 14 to inner discs 3 of the ratio varying unit 1. The carrier 15 also connects to a distal outer disc 2 of the ratio varying unit 1. The ratio varying unit 1, and simple epicyclic gear set 4 are mounted for rotation about a first shaft 6.

Three clutches, a first mode clutch 12, a second mode clutch 11, and a reverse mode clutch 13 (in this case, a brake) and a reversing epicyclic gear set 10 are mounted for rotation on intermediate shaft 7. Intermediate shaft 7 is driveably coupled to the output shaft via the final drive 5. Advantageously the brake arrangement 13 may provide lower driveline drag losses compared with a clutched arrangement. In this example, the reversing gear is of an idler epicyclic type, since it contains two rings of planets mounted on its carrier gear. In another embodiment the reverser gear may comprise an external gear pair in order to achieve a reversal of transmission output speed compared with that of the first mode.

In the first mode, the first mode clutch 12 is engaged such that drive from the inner discs 3 of the ratio varying unit 1 transmit drive to the intermediate shaft 7 via the carrier gear of epicyclic gear set 10. During launch of the vehicle from rest, the ratio varying unit 1 is at one end of its range, and the first mode clutch 12 may be slipped in order to effect a vehicle launch. In this example, the first mode clutch 12 is a wet plate clutch since it can sustain the power dissipation required during the launch manoeuvre. The ratio of the ratio varying unit 1 is allowed to sweep in a first direction, typically to the opposite extreme of ratios, until the speeds either side of the clutch 11 become the same; this is the first-second mode synchronous point. At this point, the clutch 11 may be engaged with no shock or jerk to the driveline. The clutch 12 may then be removed, and the ratio of the ratio varying unit 1 swept in a second direction, this second direction being in the opposite direction to the first direction. Throughout this procedure, the ratio of the CVT is increasing, that is, the transmission output speed is increasing (in a forwards sense) relative to the transmission input speed. At the start of the procedure the CVT ratio provides a minimum forwards ratio for vehicle launch, and at the end of the procedure the CVT ratio provides an over-drive ratio, this ratio typically being required for vehicle cruise conditions.

When reverse vehicle operation is required, the clutch 13 is engaged. As with the first mode clutch 12, the clutch 13 may be progressively engaged, and slipped, in order to effect a reverse vehicle launch.

FIG. 2 depicts a mechanical layout of an arrangement that provides a low mode, a first mode and a high mode. The low mode provides reverse and low forward speed vehicle operation, whilst the first and second modes provide forward vehicle motion up to a high overdrive transmission ratio. The mechanical connections, and the sequence of operation of the transmission, will now be described. Transmission input shaft 9 connects to the annulus gear of a simple epicyclic gear set 114. However, in this embodiment a second epicyclic (in this case, an idler epicyclic) which shares a common carrier, sun and planets with epicyclic 114, is positioned adjacent to epicyclic 114. The carrier of epicyclic 114 is connected to a proximal input disc 2 of ratio varying unit 1. Sun gear of epicyclic 114 also serves as the sun gear of idler epicyclic 21, and is connected via a hollow shaft 14 to the inner discs 3 of the ratio varying unit 1. The common carrier of epicyclics 114 and 21 is also connected to the distal outer disc 2 of the ratio varying unit 1. The ratio varying unit 1, the simple epicyclic 114 and the idler epicyclic 21 are mounted for rotation about the first shaft 6. In the low mode, the ratio varying unit is effectively connected across two epicyclic gear sets, each epicyclic being connected to the other by two of each of their elements, (that is, one element of the first epicyclic connects to one element of the second epicyclic, and a second element of the first epicyclic connects to a second element of the second epicyclic). The remaining element of each epicyclic serve as the transmission input and transmission output connections respectively.

Three clutches, the low mode clutch 20, the first mode clutch 112 and the second mode clutch 111, are mounted for rotation on intermediate shaft 7. The low mode clutch provides reverse vehicle operation as well as low speed forwards vehicle operation.

In the low mode, the low mode clutch 20 is engaged such that drive from an annulus gear 24 of the idler epicyclic 21 is transmitted to intermediate shaft 7. At one end of ratio of the ratio varying unit 1, a transmission output shaft 8 rotates in an opposite sense to that of the transmission input shaft 9, such that the vehicle travels with a maximum reverse vehicle operating speed. The ratio of the ratio varying unit 1 is swept in a second direction until the transmission output speed is zero; this is termed the "geared neutral" point of the transmission. At this point, the vehicle is stationary even though the engine is rotating and transmitting drive to the transmission input shaft 9. The ratio of the ratio varying unit 1 is swept further in the second direction, this causing the transmission to provide forwards vehicle operation, until the speeds either side of the clutch 112 are the same; this is the low-first mode synchronous point. The clutch 112 may now be engaged with no shock or jerk to the driveline. Clutch 20 may then be removed, and the ratio of the ratio varying unit swept in the first direction, this being opposite to that of the second direction. The transmission is now operating in the first mode.

In the first mode, clutch 112 is engaged such that drive from the inner discs 3 of the ratio varying unit 1 transmit drive to intermediate shaft 7. In this example, all clutches 111, 112 and 20 are wet plate clutches, although it should be noted that both forwards and reverse vehicle launch are effected without the need for slippage of a clutch. Thus power dissipation, the need for cooling, and clutch wear are decreased. The ratio of the ratio varying unit is allowed to sweep in the first direction, typically to opposite extreme of ratio, until the speeds either side of clutch 111 become the same; this is the first-second mode synchronous point. At this ratio, clutch 111 may be engaged with no shock or jerk to the driveline. Clutch 112 may then be removed, and the ratio of the ratio varying unit 1 swept once again in the second direction. Through this entire procedure, the ratio of the CVT is increasing, that is, the transmission output speed is increasing relative to the transmission input speed. At the start of the procedure the CVT ratio provides a maximum reverse ratio, and at the end of the procedure the CVT ratio provides an over-drive ratio, this ratio typically being achieved during vehicle cruise conditions.

The epicyclic (first epicyclic) and low (second) epicyclic may advantageously be arranged as a single compound epicyclic, as shown in FIG. 3. This compound epicyclic may comprise a carrier; the carrier comprising a first set of planet gears; the first set of planet gears being in mesh with a sun gear, a first annulus gear, and a second ring of planet gears; the second ring of planet gears also meshing with a second annulus gear. This may provide benefits in system cost, complexity and efficiency compared to two separate epicyclic gear set assemblies.

A toroidal variator, and in particular a pitch steer variator and associated roller control system, will now be described with reference to FIG. 4.

The variator of FIG. 4 is controlled by the mechanism disclosed in WO-A-2013104727 in which the rollers 120, 122 pivot about a pitch axis causing the rollers to tilt to a new ratio. In these embodiments each roller 120, 122 is caused to undergo pivotal movement about a pitch axis, this pitch axis passing through the contact regions between the roller and the races, thus causing each roller 120, 122 to steer to a new tilt (ratio) angle. The tilt angle defines the relative radii of input and output contacts from the variator axis, the ratio of these two radii generally defining the ratio. There is an equilibrium tilt angle for any given pitch angle since the roller 120, 122 is constrained to precess about a 'castor' axis that is inclined to the plane of the disc 110 (note that the discs are labelled 2, 3 in FIGS. 1 and 2) by an angle known as the castor angle. The castor angle may be generated by a carriage actuation point that is offset to a mid-plane of the variator cavity, this being a plane which is parallel to and equidistant from each inner and outer disc pair (2, 3) which form a variator cavity. Alternatively the rollers 120, 122 may be mounted on a gimbal with a pivot that allows the roller to tilt to change the ratio, the angle between the pivot axis and the plane of the discs defining the castor angle. The variator in FIG. 12 includes a reaction member 160 operatively coupled to the rollers 120, 122 that transmit drive between the input disc 110 and the output disc (not shown). The purpose of the reaction member is to bear reaction torque from the rollers 120, 122. The rollers 120, 122 are mounted on carriage assemblies. Each carriage assembly comprises a carrier 166, 168 and a mounting part 170, 172. Each roller 120, 122 is carried for rotation about its rolling axis on a respective carrier 166, 168. Each carrier 166, 168 is pivotally connected to (and actuated by) the respective mounting part 170, 172.

Each mounting part 170, 172 is carried on an elongate control member 174, such that it is prevented from linear movement along the control member 174. Each mounting part 170, 172 is offset from the centre plane of the toroidal cavity in a direction parallel to the variator axis, this offset defining a caster angle (a) for each roller. The control member 174 may move in a linear, reciprocal manner in direction C, causing the mounting parts 170, 172 also to move in direction C. Such movement causes the rollers 120, 122 to pivot about their respective pitch axes which causes them to tilt to a new tilt (that is, ratio) angle. The pitch axis of each roller passes through the regions of contact between said roller and each disc. Pitching about this axis requires little power, so the actuation system may be compact and of low cost. Each carriage assembly is located within the toroidal cavity by four points: by its respective mounting part 170, 172, by a reaction point at the centre of the roller 120, 122, and by the two roller contacts (one with each of the output and input disc 110). The reaction torque is borne by the reaction member 160 and not by the control member 174, thus reducing friction in the control mechanism and allowing a low force and/or power actuator. There may be two rollers 120, 122 in each toroidal cavity. Alternatively there may be 3 rollers to allow increased power capacity and/or downsizing of the variator.

The reaction member 160 comprises a body 180 having an aperture 182 through which a variator input shaft and/or output shaft (not shown) may pass. Reaction shaft 184, projects coaxially and in opposite directions from the body 180 and are aligned normal to the variator axis within the centre plane of the variator. End portions of the reaction shafts 184 are retained in guides formed, respectively, in a casing 100 of the variator and a mounting block 194 secured to the casing 100. The guides allow the reaction member 160 to slide in a radial direction, perpendicular to the variator axis, thus causing the rollers 120, 122 to precess in opposite senses when the reaction member 160 moves in response to an imbalance of roller 120, 122 reaction forces. Thus this radial movement serves to equalise the loads of the rollers 120,122 within the cavity. Advantageously this helps the rollers run at similar traction conditions to one another, thus allowing lower variator clamp loads to be applied.

The reaction member 160 is operatively linked to the centre of each roller 120, 122 by a spherical joint 186, 188 so as to transmit the reaction torque from the rollers 120, 122 to the reaction member 160 and to allow for relative pivotal movement between the rollers 120, 122 and the reaction member 160. The control member 174 passes through the reaction member 160 at an aperture 192 but is not linked to it. There is suitably sufficient clearance between the control member 174 and the aperture 192 to avoid fouling as reaction torque is borne and the reaction member 160 moves radially for the balancing of the roller loads within the cavity.

The reaction member 160 may include a damper to dampen movement of the body 180 for example in a radial direction relative to the variator axis. A mechanical end stop may be provided to limit movement of the reaction member 160 in a radial direction relative to the variator axis.

FIG. 6 shows an arrangement substantially similar to the arrangement of FIG. 2, with the modification that a synchroniser or dog clutch arrangement is provided for the high and low modes, with the high and low modes selectively couplable to a single high/low friction clutch via the synchroniser or dog clutch arrangement. This permits a reduction in the clutch drag. Preferably the synchroniser or dog clutch arrangement includes a neutral configuration in which neither the high or low modes are coupled to the output shaft. Preferably, the single high/low friction clutch may be of the "normally closed" type.

The system implications of a wider variator ratio spread have been investigated for main drive transmission applications. The following describes front wheel drive (FWD) examples of a new family of powersplit transmission concepts that have been enabled by the wider ratio range capability afforded by the PitchSteer™ control mechanism. The vehicle used was a typical B/C segment car, such as a Ford Fiesta/Focus with 125 ps EcoBoost engine. The main specifications were 1250 kg kerb weight/1550 kg GVW, 170 Nm input torque/92 kW max engine power, with an overdrive requirement of 54.4 kph/1000 rpm.

FIG. 11a shows a comparison of different launch devices and their efficiency characteristics, combined with the benefit of a reduced launch ratio. FIG. 11b shows the wider variator ratio spread also providing more powersplitting. As shown in FIGS. 11a and 11b, a wider transmission ratio spread (enabled by wider variator ratio spread) benefits launch performance by enabling a lower ratio to be provided, but also reduces the energy lost in the launch phase, irrespective of the launch device used. Secondly, wide variator ratio spread can also be beneficial for an IVT mode. These two together can lead to a double benefit in launch efficiency, and the latter also facilitating transmission architectures to be used that have high efficiency in higher modes but would normally have lower efficiency than desirable in the launch mode.

In split power transmissions, only a proportion of the transmitted power is transferred by the variator, and the remainder is transferred by a mechanical path. Generally speaking, more power splitting leads to higher efficiency, balanced by a reduction in ratio spread for a given range or mode in the transmission. Overall ratio range is typically maintained by adding more modes. A wider variator ratio range allows high efficiency to be achieved with a lower number of transmission modes. This keeps system complexity to a minimum and reduces cost and efficiency losses associated with the addition of more components, particularly clutching devices. It has been found that a variator ratio spread of 10 enables a good level of total efficiency to be achieved with relatively few components, and a good compromise between system cost/complexity and high levels of functionality.

FIG. 12a shows the first of a new transmission family. This architecture has two forwards power-split modes linked by a fully synchronous shift. The ratio spread of the transmission in the two modes combined remains the same as the variator ratio spread, but a substantial degree of power splitting occurs. This power splitting arrangement has been configured to provide the highest efficiency at the higher end of the ratio range, maximizing cruise efficiency. At the maximum overdrive ratio, more than 90% of the transmitted power bypasses the variator completely, which also implies high levels of durability for extended cruising conditions. This arrangement uses the "Low" clutch to launch the vehicle from rest. FIG. 12b shows the ratios in the different modes.

FIG. 13a shows a second architecture in the new transmission family, and is an elegant evolution of the powersplit CVT arrangement to a 3-mode IVT. The "mid" and "high" modes are identical to the powersplit modes from the previous CVT arrangement, with a combined ratio spread of 10 and high efficiency. A further synchronous shift is provided between the "low" and "mid" speed ranges. The "low" range includes a zero output speed capability, thus being termed an "Infinitely Variable Transmission", as well as reverse.

This transmission variant provides several advantages. The launch efficiency is improved over a clutch or torque converter launch device, whilst providing the refined comfort and "feel" of a torque converter launch. Another benefit provided by this arrangement is its elegance of construction, minimizing the number of elements and their associated cost and energy losses. By using only a single compound epicyclic, one selector device per mode of operation, and one layshaft, this is the lowest possible complexity for a 3-mode FWD transmission. FIG. 12b shows the ratios in the different modes.

FIG. 7 shows a further evolution in the new family. FIG. 7 shows an arrangement substantially similar to the arrangement of FIG. 6, with the addition of a clutch arrangement to ground. This is explained in more detail in relation to FIGS. 8a to 8d

FIGS. 8a and 8b depict respectively a schematic layout and a mechanical layout of an arrangement of a continuously variable transmission 300 that provides a low, a middle mode and a high mode. The low mode provides reverse and low forwards vehicle operation, whilst the middle and high modes provide forwards vehicle motion up to a high overdrive transmission ratio. The low mode is an IVT (infinitely variable transmission) and the middle and high modes are powersplit modes. The mechanical connections, and the sequence of operation of the transmission, will now be described. A transmission input shaft 301 connects to a transmission output shaft 302 via a continuously variable transmission 300. A variable ratio unit 310 comprises a first rotating side 311 and a second rotating side 312. The first rotating side 311 is coupled to a first member 321 of an epicyclic gear arrangement 320, and the second rotating side 312 is coupled to a second member 322 of the epicyclic gear arrangement 320. The epicyclic gear arrangement also comprises a third member 323. The input shaft is coupled to a fourth member 324 of the epicyclic gear arrangement 320. The first member 321 may be driveably coupled to the output shaft 302 via a first clutch arrangement 331 (M). The second member 322 may be driveably coupled to the output shaft 302 via a second clutch arrangement 332 (H). The third member 323 may be driveably coupled to the output shaft 302 via a third clutch arrangement 333 (L). A fourth clutch arrangement 334 may provide selectively variable engagement between two of the first, second or third clutch arrangements and the output shaft 302, in this embodiment between the second and third clutching arrangements 332, 333 and the output shaft 302.

The fourth clutch arrangement 334 may preferably be a normally closed friction clutch, and the second and third clutch arrangements may preferably be dog clutches or synchroniser arrangements. Preferably, they may form a single dog or synchroniser arrangement, more preferably with a neutral position when neither is engaged. This reduces clutch drag and promotes higher efficiency. There may be provided respective gear ratios 341, 342, 343 between the first, second and third members 321, 322, 323 and the first, second and third clutch arrangements 331, 332, 333. There may also be provided a gear ratio 344 between the output shaft 302 and the first, second and third clutch arrangements 331, 332, 333. A fifth clutch arrangement 335 (P) may be provided to selectively ground the third member 323. Optionally, an electric motor 350 may be coupled to the fourth member 324, and a sixth clutch arrangement 336 may selectively driveably couple the input shaft to the electric motor 350 and to the fourth member 324. The electric motor 350 and the sixth clutch arrangement 336 may be a single "hybrid module" assembly 351. Closing two clutch arrangements simultaneously can provide fixed ratio modes, as shown in FIGS. 8c and 8d. Exemplary transmission ratios are depicted in both of these figures.

This IVT arrangement firstly reduces clutch drag to a very low level, by sharing a single friction clutch for the "high" and "low" modes, enabled by the use of a double synchronizer or dog clutch. Secondly, further significant functionality can be provided for very little alteration—the addition of a selector device to ground the output of the "low" mode. When this is engaged, a fixed ratio in the transmission is provided in each mode "low"/"mid"/"high". When the fixed ratios provided in the "mid" and "high" modes are combined with the two fixed ratios that may be attained at the synchronous shift points (if adjacent mode clutches are simultaneously in a closed state), then four well-spaced, high-efficiency fixed ratios are also provided. Thus there is the option to exploit full torque continuity and seamless shifting throughout the IVT range using the variator, as well as accessing the fixed ratios of a four-speed automatic.

The table of FIG. 8d shows the shift schedule for the clutches and the overall speed ratios in each mode. The overall transmission ratios are also plotted in FIG. 8c. It can be seen that the shift schedule involves only one clutch swap per shift to an adjacent mode, which is a natural consequence of the synchronous shifts in the IVT.

The fixed ratio provided in the "low" mode is clearly a zero ratio, so this can be used as a park brake, especially if the "low"/"high" friction clutch is of the "normally closed" type (facilitated if the "low"/"high" double synchronizer or dog clutch has a neutral position, which also would eliminate any drag from the "low"/"high" friction clutch when in the "mid" mode).

FIG. 14 shows the efficiency of the 3-mode IVT with powersplit modes when driving at various Chinese and EU speed limits on a road with zero gradient. These figures include the final drive, clutch drag, variator and gear meshes in the transmission itself. The slightly lower figures for the lower speeds are due to the speed-dependent transmission losses (which are relatively low for this arrangement) becoming more significant as the drive power decreases.

Efficiency of 95-96% would appear to be a practical limit of efficiency potential for any CVT, which can be readily understood by simply multiplying the efficiencies of two gear stages by an efficiency for a variator or powersplit (variator plus epicyclic).

The above embodiments provide a refined launch feel, seamless variator shifting through synchronous modes and good driveability in a wide variety of vehicles, including passenger cars, RWD SUVs, buses, trucks and off-highway vehicles. These characteristics are particularly important for autonomous (or automated) driving, and these functional benefits come alongside reductions in fuel consumption and emissions. The new architectures presented here show a level of transmission efficiency competitive with Dual Clutch Transmissions (DCTs). The paper entitled "CVT in comparison to other transmission concepts in state-of-the-art B-class vehicle powertrains", FEV, presented at International VDI Conference, "CVT in automotive applications—Set screws for better efficiency", Friedrichshafen, 21 Jun. 2016 is a recent third party study considering this.

Another key technological direction in the automotive industry is increasing levels of powertrain hybridization. The presented family of new powersplit architectures can be enhanced/expanded by introducing an electric machine (motor-generator), providing further reductions in energy consumption and emissions, with minimal modification to the base version of the transmission. Several suitable locations for the machine provide slightly different functionality.

A suitable transmission is potentially able to reduce the size and cost of the electric machine and associated ancillaries whilst maintaining vehicle performance. A small 20-30 kW electric machine is sufficient to obtain a significant proportion of the available kinetic energy recovery benefit on standard drive cycles. Additionally, this power rating is also sufficient to undertake typical inner city manoeuvres, enabling extended periods of "zero emissions" driving, assuming sufficient energy storage capacity. As shown in FIG. 15, the wide ratio spread of the Torotrak variator could enable a small hybrid motor to generate full wheel torque at low vehicle speeds, potentially making a significant difference to the torque rating of the motor and consequently its size and cost. Torotrak IVTs can also provide high torque multiplication.

Since state of the art electric motor maps often have broad regions of high efficiency (and relatively flat efficiency characteristics), it is not necessarily straightforward, in energy terms, to benefit from the use a CVT compared to a stepped gear system. However, multi-speed electric systems typically elect a low number of ratios for system cost, and are typically limited to ratio steps of around 1.4, due to shift quality considerations—see the paper entitled "MSYS: Highly efficient 3 speed electric vehicle powertrain", Drive System Design, presented by A. Tylee-Birdsall at IMechE "Developments in Transmissions and Drivelines" conference, held at MIRA, Nuneaton, UK, 25 Sep. 2012.

This limits the ratio range to around 1.96-2.7 and therefore also the torque multiplication potential without over-speeding the motor. By contrast, a Torotrak PitchSteer™ variator is not so limited in ratio range, and is a fully seamless powershift device, requiring very low actuation power. As has been presented, the new family of transmissions are able to provide several high efficiency fixed ratios accessed via synchronous shifts in the working range of the transmission. Thus Torotrak have made use of the fixed ratios and seamless shifting capability already present in the transmission architectures, allowing minimal alteration to the base version—see FIG. 8b.

The above described invention aims to fulfil the requirements of CVTs for light automotive applications. Recent variator developments have led to reductions in system cost and wide ratio range potential of ten or more. This has a double benefit of improving launch efficiency for any launch device (by virtue of providing a lower launch ratio), and also enabling high efficiency powersplit CVT and IVT arrangements with fewer modes to be provided. High transmission efficiencies of 95% have been shown to be achievable (including the final drive).

Additional fuel economy benefits in IVT layouts can be realised by eliminating the torque convertor used in incumbent production CVTs and automatic transmissions.

The technology is applicable across a wide range of vehicles, being fully scalable to higher torques/powers and can be packaged in both FWD and RWD platforms.

Future technology trends, such as autonomous/automated driving would favour the full torque continuity of Torotrak variable ratio transmissions, particularly in IVT form. Suitable for an electric and hybrid vehicle transmissions, low-cost full hybrid functionality can be achieved with the new family of Torotrak transmission concepts by the simple addition of a small motor.

Embodiments of the invention have been described above purely by way of example. The skilled person will appreciate that other embodiments of the invention are possible, all of which are comprised within the scope of the appended claims.

The invention claimed is:

1. A continuously variable transmission (CVT) comprising a ratio varying unit and a compound epicyclic gear set;
   the ratio varying unit having a rotating first side and a rotating second side, rotational axes of the first and second sides being coaxial,
   the compound epicyclic gear set comprising a first set of planets,
   the first set of planets being rotationally mounted within a carrier and meshing with a sun gear, a first annulus gear, and a second set of planets;
   the second set of planets also being rotationally mounted within the carrier and meshing with a second annulus gear;
   one of the first or second rotating sides of the ratio varying unit being driveably coupled to the carrier and the other of the first or second rotating sides of the ratio varying unit being driveably coupled to the sun gear,
   wherein one of the first and second rotating sides of the ratio varying unit is directly connected to the carrier of the compound epicyclic gear set without any other component connected between the one of the first and second rotating sides and the carrier, wherein the other of the first and second rotating sides of the ratio varying unit is connected to the sun gear through a hollow shaft without any other component connected between the other of the first and second rotating sides and the sun gear, and wherein at least one of the first annulus gear and the second annulus gear of the compound epicyclic gear set is directly connected to an input shaft of the CVT.

2. A CVT according to claim 1, wherein the ratio varying unit provides a negative speed ratio between the first and second rotating sides.

3. A CVT according to claim 2, wherein the ratio varying unit comprises a toroidal variator.

4. A CVT according to claim 3, wherein the ratio varying unit comprises a full toroidal variator.

5. A CVT according to claim 1, wherein a rotational axis of the compound epicyclic gear set is coaxial with the rotational axes of the first and second sides of the ratio varying unit.

6. A transmission comprising:
   a ratio varying unit having at least one input disc and at least one output disc axially spaced from the at least one input disc, and
   a compound epicyclic gear set coupled to the ratio varying unit that includes a carrier, a first set of planets supported by the carrier and meshing with a sun gear and a first annulus gear of the compound epicyclic gear set, and a second set of planets supported by the carrier and meshing with a second annulus gear of the compound epicyclic gear set,
   wherein the at least one input disc is directly connected to the carrier, wherein the at least one output disc is directly connected to the sun gear, and wherein at least one of the first annulus gear and the second annulus gear of the compound epicyclic gear set is directly connected to an input shaft of the transmission.

7. The transmission of claim 6, further comprising
   an intermediate shaft radially spaced from a first shaft on which the ratio varying unit and the compound epicyclic gear set are mounted for rotation; and
   a plurality of clutches mounted for rotation on the intermediate shaft, wherein the plurality of clutches include a low mode clutch, a first mode clutch, and a second mode clutch.

8. The transmission of claim 7, wherein during a low operation mode of the transmission, the low mode clutch is engageable to transmit rotation from the compound epicyclic gear set to the intermediate shaft, and wherein during the low operation mode, rotation transmitted to the intermediate shaft is at least partially transmitted to a second shat radially spaced from the first shaft and the intermediate shaft to provide one or more reverse speed ratios.

9. The transmission of claim 7, wherein during a first operation mode of the transmission, the first mode clutch is engageable to transmit rotation from the at least one output disc to the intermediate shaft, and wherein during the first operation mode, rotation transmitted to the intermediate shaft is at least partially transmitted to the second shaft to provide one or more forward speed ratios.

10. The transmission of claim 9, wherein during a second operation mode of the transmission, the second mode clutch is engageable to transmit rotation from the at least one input disc to the intermediate shaft, and wherein during the second operation mode, rotation transmitted to the intermediate shaft is at least partially transmitted to the second shaft to provide one or more forward speed ratios.

11. The transmission of claim 8, wherein the first shaft is the input shaft of the transmission and the second shaft is an output shaft of the transmission.

12. The transmission of claim 11, wherein during the low operation mode, rotation transmitted to the intermediate shaft is not transmitted to the second shaft to provide a geared neutral speed ratio.

13. The transmission of claim 12, wherein during the low operation mode, rotation transmitted to the intermediate shaft is at least partially transmitted to the second shaft to provide one or more forward speed ratios.

14. A transmission comprising:
   a ratio varying unit having at least one input disc and at least one output disc axially spaced from the at least one input disc, wherein the at least one input disc and the at least one output disc are mounted on a first shaft;
   a compound epicyclic gear set mounted on the first shaft that includes a carrier directly connected to the at least one input disc, a first set of planets supported by the carrier and meshing with a first annulus gear of the compound epicyclic gear set and a sun gear that is directly connected to the at least one output disc, and a second set of planets supported by the carrier and meshing with a second annulus gear of the compound epicyclic gear set; and
   a plurality of clutches mounted on a second shaft radially spaced from the first shaft, wherein the first shaft is an input shaft of the transmission, wherein the first and second shafts are radially spaced from an output shaft of the transmission, and wherein at least one of the first annulus gear and the second annulus gear of the compound epicyclic gear set is directly connected to the first shaft.

15. The transmission of claim 14, wherein the plurality of clutches include three clutches each mounted to the second shaft.

16. The transmission of claim 14, wherein during one operation mode of the transmission, one of the plurality of clutches is engageable to transmit rotation from the compound epicyclic gear set to the second shaft, and wherein during the one operation mode, rotation transmitted to the second shaft is at least partially transmitted to the output shaft to provide one or more reverse speed ratios.

17. The transmission of claim 16, wherein during the one operation mode, rotation transmitted to the second shaft is not transmitted to the output shaft to provide a geared neutral speed ratio.

18. The transmission of claim 17, wherein during the one operation mode, rotation transmitted to the second shaft is at least partially transmitted to the output shaft to provide one or more forward speed ratios.

19. The transmission of claim 14, wherein during one operation mode of the transmission, one of the plurality of clutches is engageable to transmit rotation from the at least one output disc to the second shaft, and wherein during the one operation mode, rotation transmitted to the second shaft is at least partially transmitted to the output shaft to provide one or more forward speed ratios.

20. The transmission of claim 19, wherein during another operation mode of the transmission, another of the plurality of clutches is engageable to transmit rotation from the at least one input disc to the second shaft, and wherein during the another operation mode, rotation transmitted to the second shaft is at least partially transmitted to the output shaft to provide one or more forward speed ratios.

* * * * *